(12) United States Patent
Geirhofer et al.

(10) Patent No.: US 8,995,400 B2
(45) Date of Patent: Mar. 31, 2015

(54) METHOD AND APPARATUS FOR ENABLING CHANNEL AND INTERFERENCE ESTIMATIONS IN MACRO/RRH SYSTEM

(75) Inventors: Stefan Geirhofer, San Diego, CA (US); Wanshi Chen, San Diego, CA (US); Tao Luo, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 13/358,164

(22) Filed: Jan. 25, 2012

(65) Prior Publication Data

US 2012/0208547 A1  Aug. 16, 2012

Related U.S. Application Data

(63) Continuation-in-part of application No. 13/336,599, filed on Dec. 23, 2011.

(60) Provisional application No. 61/442,087, filed on Feb. 11, 2011, provisional application No. 61/442,129, filed on Feb. 11, 2011.

(51) Int. Cl.
*H04W 24/10* (2009.01)
*H04L 5/00* (2006.01)
(Continued)

(52) U.S. Cl.
CPC ............ *H04L 5/0035* (2013.01); *H04B 7/0626* (2013.01); *H04J 11/0053* (2013.01); *H04L 5/0032* (2013.01); *H04L 5/0048* (2013.01);
(Continued)

(58) Field of Classification Search
None
See application file for complete search history.

(56) References Cited

U.S. PATENT DOCUMENTS 6,549,787 B1  4/2003  Ravi
8,576,792 B2  11/2013  Kim et al.
(Continued)

FOREIGN PATENT DOCUMENTS

JP  2010068496 A  3/2010
JP  2011004212 A  1/2011
(Continued)

OTHER PUBLICATIONS

International Search Report and Written Opinion—PCT/US2012/023040—ISA/EPO—Sep. 10, 2012.
(Continued)

*Primary Examiner* — Jianye Wu
(74) *Attorney, Agent, or Firm* — Arent Fox, LLP

(57) ABSTRACT

Aspects disclosed herein relate to channel and interference estimations in a coordinated multi-point (CoMP) environment. In the disclosed aspects, an eNB may be equipped to signal an identifier indicating a plurality of resource patterns, each associated with a resource pattern group, and each including a first resource element pattern for channel estimation and a second resource element pattern for interference estimation. The UE may be equipped to receive the signaling and perform channel estimation based at least in part on the first resource element pattern, and interference estimation based at least in part on the second resource pattern generate at least one channel state report based on the channel and interference estimations, and transmit at least one channel state report to an eNB. The eNB may determine one or more resources for use by the UE based on the at least one received channel state report.

52 Claims, 19 Drawing Sheets

(51) Int. Cl.
  *H04B 7/06* (2006.01)
  *H04J 11/00* (2006.01)
  *H04L 25/02* (2006.01)
  *H04B 7/02* (2006.01)

(52) U.S. Cl.
  CPC ............ *H04L 5/006* (2013.01); *H04L 25/0226* (2013.01); *H04B 7/024* (2013.01); *H04L 5/0092* (2013.01); *H04L 25/0228* (2013.01)
  USPC .......................................... 370/332; 370/252

(56) References Cited

U.S. PATENT DOCUMENTS

| | | |
|---|---|---|
| 8,599,711 B2 | 12/2013 | Hugl et al. |
| 2005/0272472 A1 | 12/2005 | Goldberg et al. |
| 2006/0276227 A1 | 12/2006 | Dravida |
| 2007/0167181 A1 | 7/2007 | Ramesh et al. |
| 2008/0049791 A1 | 2/2008 | Tirkkonen et al. |
| 2008/0316950 A1 | 12/2008 | Damnjanovic |
| 2009/0235176 A1 | 9/2009 | Jayanthi |
| 2009/0247067 A1 | 10/2009 | Li et al. |
| 2009/0253426 A1 | 10/2009 | Qiu et al. |
| 2009/0296635 A1 | 12/2009 | Hui et al. |
| 2010/0034175 A1 | 2/2010 | Xiao et al. |
| 2010/0067592 A1 | 3/2010 | Goldhamer |
| 2010/0067627 A1 | 3/2010 | Lincoln et al. |
| 2010/0075706 A1 | 3/2010 | Montojo et al. |
| 2010/0099428 A1 | 4/2010 | Bhushan et al. |
| 2010/0118989 A1 | 5/2010 | Sayana et al. |
| 2010/0177746 A1 | 7/2010 | Gorokhov et al. |
| 2010/0195635 A1 | 8/2010 | Maeda |
| 2010/0285810 A1 | 11/2010 | Ko et al. |
| 2010/0290413 A1 | 11/2010 | Kuwahara |
| 2010/0311349 A1 | 12/2010 | Koo et al. |
| 2010/0311437 A1 | 12/2010 | Palanki et al. |
| 2010/0317343 A1 | 12/2010 | Krishnamurthy et al. |
| 2010/0322227 A1 | 12/2010 | Luo |
| 2010/0323684 A1 | 12/2010 | Cai et al. |
| 2011/0026482 A1 | 2/2011 | Li et al. |
| 2011/0044250 A1 | 2/2011 | Han et al. |
| 2011/0075624 A1 | 3/2011 | Papasakellariou et al. |
| 2011/0151886 A1 | 6/2011 | Grayson et al. |
| 2011/0176440 A1 | 7/2011 | Frank et al. |
| 2011/0176634 A1 | 7/2011 | Yoon et al. |
| 2011/0183669 A1 | 7/2011 | Kazmi |
| 2011/0194536 A1 | 8/2011 | Kim et al. |
| 2011/0199986 A1* | 8/2011 | Fong et al. ................. 370/329 |
| 2011/0244877 A1 | 10/2011 | Farajidana et al. |
| 2011/0261673 A1 | 10/2011 | Luo et al. |
| 2011/0268050 A1 | 11/2011 | Farajidana et al. |
| 2011/0268077 A1 | 11/2011 | Wan et al. |
| 2011/0274188 A1 | 11/2011 | Sayana et al. |
| 2011/0317657 A1 | 12/2011 | Chmiel et al. |
| 2011/0319025 A1 | 12/2011 | Siomina et al. |
| 2012/0057566 A1 | 3/2012 | Ahmadi |
| 2012/0088458 A1 | 4/2012 | Nogami et al. |
| 2012/0100844 A1 | 4/2012 | Baldemair et al. |
| 2012/0176939 A1 | 7/2012 | Qu et al. |
| 2012/0201163 A1 | 8/2012 | Joengren et al. |
| 2012/0207043 A1 | 8/2012 | Geirhofer et al. |
| 2012/0207105 A1 | 8/2012 | Geirhofer et al. |
| 2012/0208541 A1 | 8/2012 | Luo et al. |
| 2012/0208541 A1* | 8/2012 | Geirhofer et al. .......... 455/452.2 |
| 2012/0213108 A1 | 8/2012 | Ji et al. |
| 2012/0213261 A1 | 8/2012 | Sayana et al. |
| 2012/0315859 A1 | 12/2012 | Lee et al. |
| 2013/0033998 A1 | 2/2013 | Seo et al. |
| 2013/0039203 A1 | 2/2013 | Fong et al. |
| 2013/0051240 A1 | 2/2013 | Bhattad et al. |
| 2013/0250913 A1 | 9/2013 | Geirhofer et al. |

FOREIGN PATENT DOCUMENTS

| | | |
|---|---|---|
| JP | 2012519998 A | 8/2012 |
| KR | 20070106391 A | 11/2007 |
| WO | 2010039066 A1 | 4/2010 |
| WO | 2010100077 A1 | 9/2010 |
| WO | WO2010106549 A2 | 9/2010 |
| WO | 2010126711 A1 | 11/2010 |
| WO | 2010150898 A1 | 12/2010 |
| WO | WO2011009486 A1 | 1/2011 |
| WO | WO2011020062 A2 | 2/2011 |
| WO | WO2011057037 A2 | 5/2011 |
| WO | WO2011100672 A1 | 8/2011 |
| WO | 2012059139 A1 | 5/2012 |
| WO | 2013007207 A1 | 1/2013 |

OTHER PUBLICATIONS

NTT Docomo: "Throughput Performance Evaluation of RE Muting for Inter-cell CSI-RS," 3GPP Draft; R1-105433 CSIRS PDSCH Muting Evaluation, 3rd Generation Partnership Project (3GPP), Mobile Competence Centre; 650, Route Des Lucioles; F-06921 Sophia-Antipolis Cedex; France, vol. RAN WG1, No. Xian,China; 20101011, Oct. 5, 2010, XP050450566, [retrieved on Oct. 5, 2010] p. 3, paragraph 2.

Motorola: "Impace to HeNB interference on paging channel performance", 3GPP Draft; R4-092399, 3rd Generation Partnership Project (3GPPP), Mobile Competence Centre; 650, Route Des Lucioles; F-06921 Sophia-Antipolis Cedex ; France, No. Los Angeles, CA; 20090625, Jun. 25, 2009, XP 050353633, [retrieved on Jun. 25, 2009].

Pantech: "Considerations on signalling for PDSCH muting in LTE-Advanced", 3GPP Draft; R1-105303, 3rd Generation Partnership Project (3GPP), Mobile Competence Centre ; 650, Route Des Lucioles; F-06921 Sophia-Antipolis Cedex, France; vol. RAN WG1, No. Xia an, China; 201010, Oct. 14, 2010, XP050489302, [retrieved on Oct. 14, 2010] section 2.

ZTE: "Interference coordination for control channels under non-CA based heterogeneous deployments", 3GPP Draft; R1-104566, 3rd Generation Partnership Project (3GPP), Mobile Competence Centre; 650, Route Des Lucioles; F-06921 Sophia-Antipolis Cedex; France; vol. RAN WG1, No. Madrid, Spain; 20100823, Aug. 17, 2010, XP050449863, [retrieved on Aug. 17, 2010] abstract; figure 4 sections 1, 4.

Gatt: "Design of reference signals for relay backhaul link in LTE-A", R1-094152, 3rd Generation Partnership Project (3GPP), Mobile Competence Centre; 650, Route Des Lucioles; F-06921 Sophia-Antipalis Cedex; France, No. Miyazaki, Oct. 12, 2009, XP050388622, [retrieved on Oct. 5, 2009].

Discussion on RS Design for Higher-order MIMO in LTE-A Document for Discussions, 3GPP Draft; R1-091591 (Nortel-RS Design for MIMO in LTE-A), 3rd Generation Partnership Project (3GPP), Mobile Competence Centre ; 650, Route Des Lucioles ; F-06921 Sophia-Antipolis Cedex ; France, No. Seoul , Korea; 20090328, Mar. 28, 2009, XP050339139, [retrieved on Mar. 28, 2009].

Huawei et al., "CoMP clarification of definitions and TP", R1-083906, 3rd Generation Partnership Project (3GPP), Mobile Competence Centre; 650, Route Des Lucioies; F-06921 Sophia-Antipolis Cedex; France, No. Prague, Czech Republic, Oct. 6, 2008, XP050317217, [retrieved on Oct. 6, 2008].

Intel Corporation (UK) : "Proposal on CoMP evaluation methodology", R1-110250, 3rd Generation Partnership Project (3GPP), Mobile Competence Centre; 650, Route Des Lucioles; F-06921 Sophia-Antipolis Cedex; France, vol. RAN WG1, No. Dublin, Ireland, Jan. 11, 2011, XP050490154, [retrieved on Jan. 11, 2011].

LG, "LTE Advanced," Nov. 4, 2010, 181 pages.

Motorola Solutions: "Proposals for consideration for CoMP enhancements", 3GPP Draft; R1-110291, 3rd Generation Partnership Project (3GPP), Mobile Competence Centre; 650, Route Des Lucioles; F-06921 Sophia-Antipolis Cedex; France, vol. RAN WG1, No. Dublin, Ireland, 20110117, Jan. 13, 2011, XP 050490370, [retrieved on Jan. 13, 2011].

(56) References Cited

OTHER PUBLICATIONS

Panasonic: "DM-RS for R-PDCCH and R-PDSCH", R1-094515, 3rd Generation Partnership Project (3GPP), Mobile Competence Centre; 650, Route Des Lucioles; F-06921 Sophia-Antipolis Cedex; France, Jeju, Nov. 9, 2009, XP050388935, [retrieved on Nov. 13, 2009].
Partial International Search Report—PCT/US2012/023040—ISA/EPO—May 31, 2012.
Prakash Bhat et al; "LTE-advanced: an operator perspective", IEEE Communications Magazine, IEEE Service Center, Piscataway, US, vol. 50, No. 2, Feb. 1, 2012, pp. 104-114, XP011417046, ISSN: 0163-6804, DOI: 10.1109/MCOM.2012.6146489 last paragraph of chapter "Features of LTE-A UL MIMO" chapter "CoMP Overview" last thre paragraphs of chapter "CoMP Deployment Considerations".
Samsung: "Remaining Issues on CSI-RS Transmission", 3GPP Draft; R1-105377 Remaining Issues on CSI-RS, 3rd Generation Partnership Project (3GPP), Sophia-Anti Polis Cedex ; France, vol. RAN WG1, No. Xi'an; 20101011, Oct. 5, 2010, XP050450526, [retrieved on Oct. 5, 2010].
Alcatel-Lucent et al., "Further Details of CoMP Scenarios for Evaluation, Especially Scenario 4", 3GPP TSG RAN WG1 #64, R1-110802, Feb. 15, 2011, pp. 1-8, Retrieved from URL: http://www.3gpp.org/ftp/tsg_ran/WG1_RL1/TSGR1_64/Docs/R1-110802.zip.
Catt: "Considerations on scenarios and simulation assumptions of CoMP," R1-110059, 3GPP, Jan. 17-21, 2011, pp. 1-5.
Huawei: CoMP clarification of definitions and TP, 3GPP TSG RAN WG1 Meeting #55, R1-084351, Prague, Czech Republic, Nov. 10-14, 2008, pp. 1-5.
Motorola Mobility, "Discussion of RRH Deployment with Single Cell ID", 3GPP TSG-RAN WG1#64 R1-110869, Taiwan, Feb. 21, 2011.
Motorola Mobility: "Overview of Coordinated Multi-Point Operation for LTE", 3GPP TSG RAN1 #63bis, R1-110301, Jan. 2011, pp. 1-3, Retrieved from URL: http://www.3gpp.org/ftp/tsg_ran/WG1_RL1/TSGR1_63b/Docs/R1-110301.zip.
Qualcomm Europe: "Details of CSI-RS", 3GPP TSG-RAN WG1 #59, R1-094867, Nov. 9-13, 2009, Jeju, Korea, pp. 1-6.
Qualcomm Europe: "Impact of Downlink CoMP on the Air Interface" 3GPP Draft; R1-090366, 3rd Generation Partnership Project (3GPP), Mobile Competence Centre ; 650, Route Des Lucioles; F-06921 Sophia-Antipolis Cedex ; France, No. Ljubljana; 20090108, 3 Pages, XP050318270, Jan. 8, 2009.
Qualcomm Incorporated: "Signaling and Configuration of CSI-RS", 3GPP Draft; R1-104797 Signaling and Configuration of CSI-RS, 3rd Generation Partnership Project (3GPP) , Mobile Competence Centre ; 650, Route Deslucioles ; F-06921 Sophia-Antipoliscedex; France, vol. RAN WG1, No. Madrid, Spain; 20100823, Aug. 17, 2010, XP050449989,[retrieved on Aug. 17, 2010)sections 4 and 5.
Samsung: "Details of CQI definition for LTE-A", 3GPP Draft; R1-106034, 3rd Generation Partnership Project (3GPP), Mobile Competence Centre ; 650, Route Des Lucioles ; F-06921 Sophia-Antipolis Cedex ; France, vol. RAN WG1, No. Jacksonville, USA; 20101115, Nov. 9, 2010, XP050466815, [retrieved on Nov. 9, 2010] section 1 Introduction section 3 CQI definition for Rel-10 section 7.2.3 Channel quality indicator (CQI) definition.
Samsung: "DL RS Designs for LTE-Advanced," R1-091231, 3GPP, Mar. 23-27, 2009, pp. 1-5.
Translation of First Office Action from counterpart Japanese Application No. 2013-553428, dated Sep. 16, 2014, 5 pages (111041JP).
Translation of First Office Action from counterpart Japanese Application No. 2013-553446, dated Jul. 1, 2014, 3 pages (111040JP).
Translation of First Office Action from counterpart Japanese Application No. 2013-553457, dated Sep. 2, 2014, 6 pages.
ZTE: "Enhanced Transmit Diversity Schemes for LTE-A Downlink," R1-091708, 3GPP, May 4-8, 2009, pp. 1-18.
ZTE: "Remaining Issues of CSI Feedback", 3GPP Draft; R1-110174, 3rd Generation Partnership Project (3GPP), Mobile Competence Centre ; 650, Route Des Lucioles ; F-06921 Sophia-Antipolis Cedex ; France, vol. RAN WG1, No. Dublin, Ireland, 20110117, Jan. 13, 2011, XP050490359, [retrieved on Jan. 13, 2011].

\* cited by examiner

METHOD AND APPARATUS FOR ENABLING CHANNEL AND INTERFERENCE ESTIMATIONS IN MACRO/RRH SYSTEM

CROSS-REFERENCE TO RELATED APPLICATION(S)

This application is a Continuation-in-Part of U.S. Utility application Ser. No. 13/336,599, entitled "METHOD AND APPARATUS FOR ENABLING CHANNEL AND INTERFERENCE ESTIMATIONS IN MACRO/RRH SYSTEM" and filed on Dec. 23, 2011, which claims the benefit of U.S. Provisional Application Ser. No. 61/442,087, entitled "METHOD AND APPARATUS FOR ENABLING CHANNEL AND INTERFERENCE ESTIMATIONS IN MACRO/ RRH SYSTEM" and filed on Feb. 11, 2011, which claims the benefit of U.S. Provisional Application Ser. No. 61/442,129, entitled "COOPERATION AND OPERATION OF MACRO AND REMOTE RADIO HEAD DEPLOYMENTS IN HETEROGENEOUS NETWORKS" and filed on Feb. 11, 2011, which are expressly incorporated by reference herein in its entirety.

BACKGROUND

1. Field

The present disclosure relates generally to communication systems, and more particularly, to a system and method for enabling channel estimation and interference estimation in coordinated multi-point (CoMP) environment.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with enabling channel estimation and interference estimation in a CoMP environment. In one example, an eNB may be equipped to signal an identifier indicating a plurality of resource patterns, each associated with a resource pattern group, and each including a first resource element pattern to be used for channel estimation and a second resource element pattern to be used for interference estimation. The UE may be equipped to receive the signaling and perform channel estimation based at least in part on the first resource element pattern, and interference estimation based at least in part on the second resource pattern generate at least one channel state report based on the channel and interference estimations, and transmit at least one channel state report to an eNB. The eNB may determine one or more resources for use by the UE based on the at least one received channel state report.

According to related aspects, a method for enabling channel estimation and interference estimation in a CoMP environment is provided. The method can include signaling an identifier, to a UE, indicating a first resource pattern for a first resource pattern group and a second resource pattern for a second resource pattern group to measure channel state conditions. In one aspect, the first and second resource pattern groups each include a first resource element pattern for channel estimation and a second resource element pattern for interference estimation. Furthermore, the method may include receiving at least one channel state condition report from the UE based, at least in part, on measurements obtained based on at least one of the first resource pattern or the second resource pattern. Moreover, the method can include determining one or more resources for use by the UE based on the at least one received channel state condition report.

Another aspect relates to a wireless communications apparatus. The wireless communications apparatus can include means for signaling an identifier, to a UE, indicating a first resource pattern for a first resource pattern group and a second resource pattern for a second resource pattern group to measure channel state conditions. In one aspect, the first and second resource pattern groups each include a first resource element pattern for channel estimation and a second resource element pattern for interference estimation. Furthermore, the wireless communications apparatus can include means for receiving at least one channel state condition report from the UE based, at least in part, on measurements obtained based on at least one of the first resource pattern or the second resource pattern. Moreover, the wireless communications apparatus can include means for determining one or more resources for use by the UE based on the at least one received channel state condition report.

Another aspect relates to a wireless communications apparatus. The apparatus can include a processing system configured to signal an identifier, to a UE, indicating a first resource pattern for a first resource pattern group and a second resource pattern for a second resource pattern group to measure channel state conditions. In one aspect, the first and second resource pattern groups each include a first resource element pattern for channel estimation and a second resource element pattern for interference estimation. Furthermore, the processing system may be configured to receive at least one channel state condition report from the UE based, at least in part, on measurements obtained based on at least one of the first resource pattern or the second resource pattern. Moreover, the processing system may further be configured to determine one or more resources for use by the UE based on the at least one received channel state condition report.

Another aspect relates to a computer program product, which can have a computer-readable medium comprising code for signaling an identifier, to a UE, indicating a first resource pattern for a first resource pattern group and a second resource pattern for a second resource pattern group to measure channel state conditions. In one aspect, the first and second resource pattern groups each include a first resource element pattern for channel estimation and a second resource element pattern for interference estimation. Furthermore, the computer-readable medium can include code for receiving at least one channel state condition report from the UE based, at least in part, on measurements obtained based on at least one of the first resource pattern or the second resource pattern. Moreover, the computer-readable medium can include code for determining one or more resources for use by the UE based on the at least one received channel state condition report.

According to related aspects, a method for enabling channel estimation and interference estimation in a CoMP environment is provided. The method can include receiving, by a UE, an identifier indicating signaling of a first resource pattern for a first resource pattern group and a second resource pattern for a second resource pattern group. In one aspect, the first and second resource pattern groups each include a first resource element pattern for channel estimation and a second resource element pattern for interference estimation. Further, the method can include performing channel estimation for the first resource pattern group using the first resource element pattern associated with the first resource pattern and for the second resource pattern group using the first resource element pattern associated with the second resource pattern. Further, the method can include performing interference estimation for the first resource pattern group using the second resource element pattern associated with the first resource pattern and for the second resource pattern group using the second resource element pattern associated with the second resource pattern. Further, the method can include generating a channel state condition report for at least one of the first or second resource pattern groups based on at least a portion of the interference and channel estimations. Moreover, the method can include transmitting the channel state condition report.

Another aspect relates to a wireless communications apparatus. The wireless communications apparatus can include means for receiving, by a UE, an identifier indicating signaling of a first resource pattern for a first resource pattern group and a second resource pattern for a second resource pattern group. In one aspect, the first and second resource pattern groups each include a first resource element pattern for channel estimation and a second resource element pattern for interference estimation. Further, the wireless communications apparatus can include means for performing channel estimation for the first resource pattern group using the first resource element pattern associated with the first resource pattern and for the second resource pattern group using the first resource element pattern associated with the second resource pattern. Further, the wireless commutations device can include means for performing interference estimation for the first resource pattern group using the second resource element pattern associated with the first resource pattern and for the second resource pattern group using the second resource element pattern associated with the second resource pattern. Further, the wireless commutations device can include means for generating a channel state condition report for at least one of the first or second resource pattern groups based on at least a portion of the interference and channel estimations. Moreover, the wireless communications apparatus can include means for transmitting the channel state condition report.

Another aspect relates to a wireless communications apparatus. The apparatus can include a processing system configured to receive an identifier indicating signaling of a first resource pattern for a first resource pattern group and a second resource pattern for a second resource pattern group. In one aspect, the first and second resource pattern groups each include a first resource element pattern for channel estimation and a second resource element pattern for interference estimation. Further, the processing system may be configured to perform channel estimation for the first resource pattern group using the first resource element pattern associated with the first resource pattern and for the second resource pattern group using the first resource element pattern associated with the second resource pattern. Further, the processing system may be configured to perform interference estimation for the first resource pattern group using the second resource element pattern associated with the first resource pattern and for the second resource pattern group using the second resource element pattern associated with the second resource pattern. Further, the processing system may be configured to generate a channel state condition report for at least one of the first or second resource pattern groups based on at least a portion of the interference and channel estimations. Moreover, the processing system may further be configured to transmit the channel state condition report.

Another aspect relates to a computer program product, which can have a computer-readable medium including code for receiving, by a UE, an identifier indicating signaling of a first resource pattern for a first resource pattern group and a second resource pattern for a second resource pattern group. In one aspect, the first and second resource pattern groups each include a first resource element pattern for channel estimation and a second resource element pattern for interference estimation. Further, the computer-readable medium can include code for performing channel estimation for the first resource pattern group using the first resource element pattern associated with the first resource pattern and for the second resource pattern group using the first resource element pattern associated with the second resource pattern. Further, the computer-readable medium can include code for performing interference estimation for the first resource pattern group using the second resource element pattern associated with the first resource pattern and for the second resource pattern group using the second resource element pattern associated with the second resource pattern. Further, the computer-readable medium can include code for generating a channel state condition report for at least one of the first or second resource pattern groups based on at least a portion of the interference and channel estimations. Moreover, the computer-readable medium can include code for transmitting the channel state condition report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
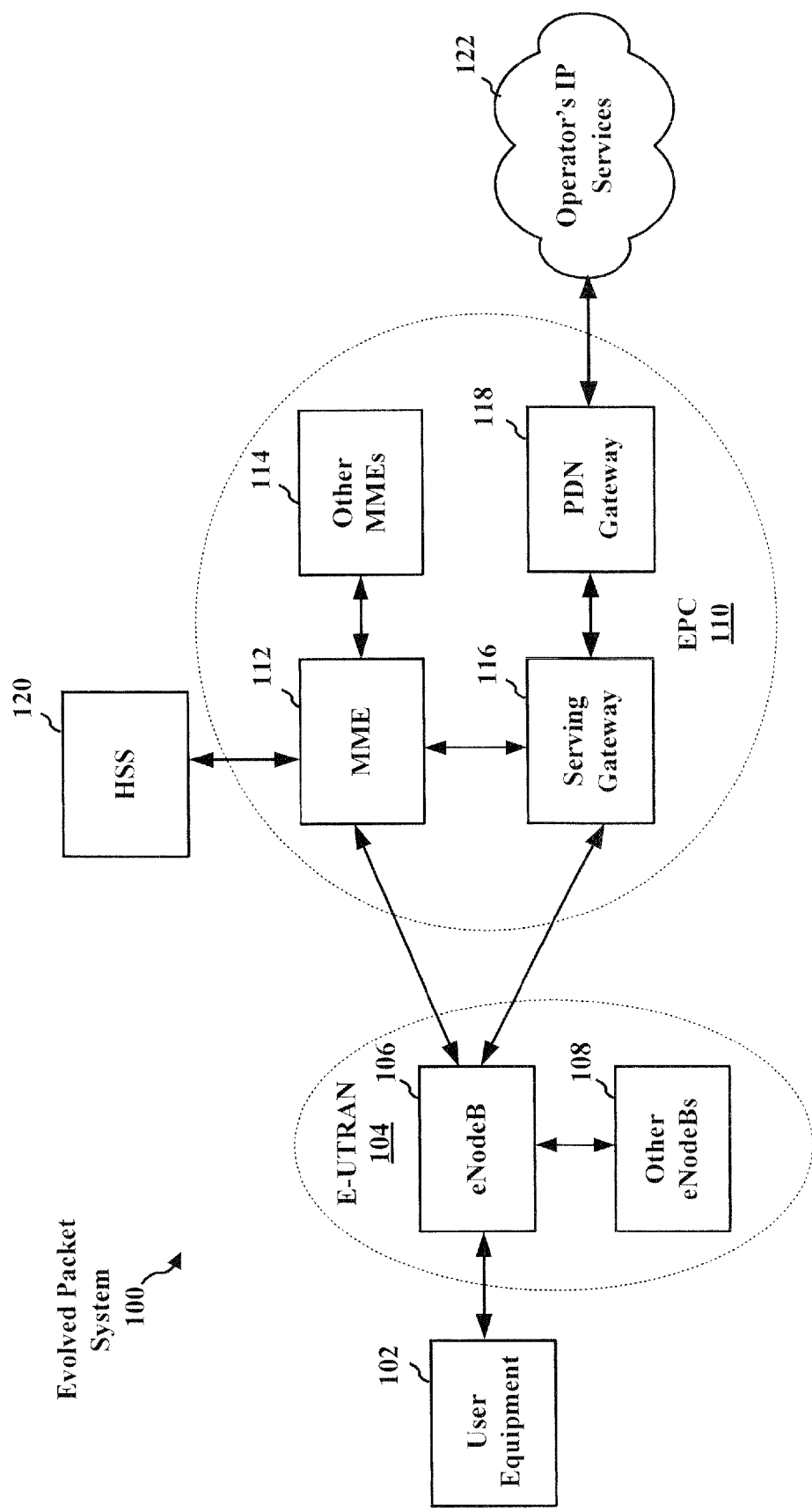
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and riot limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
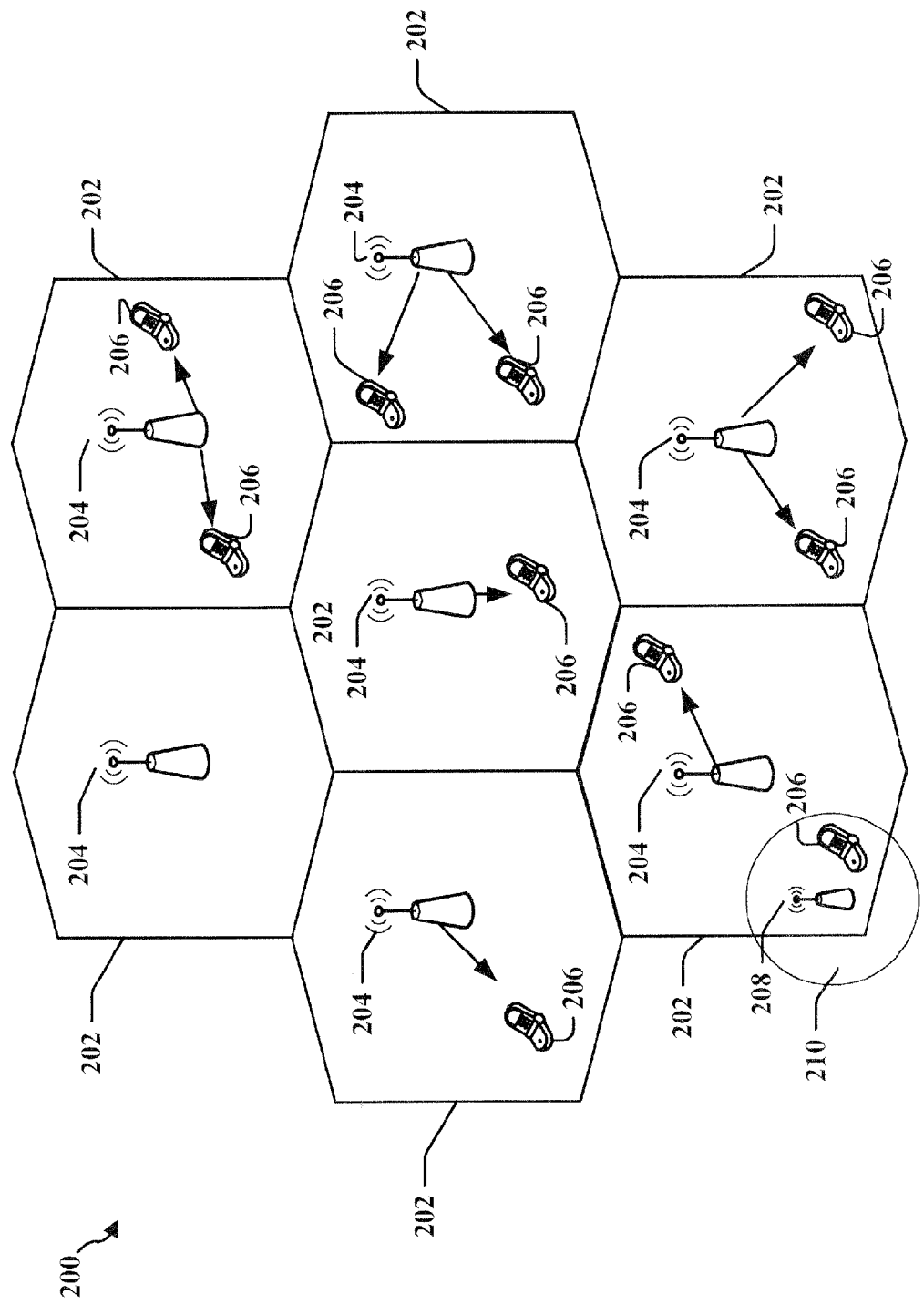
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA: Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beam forming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
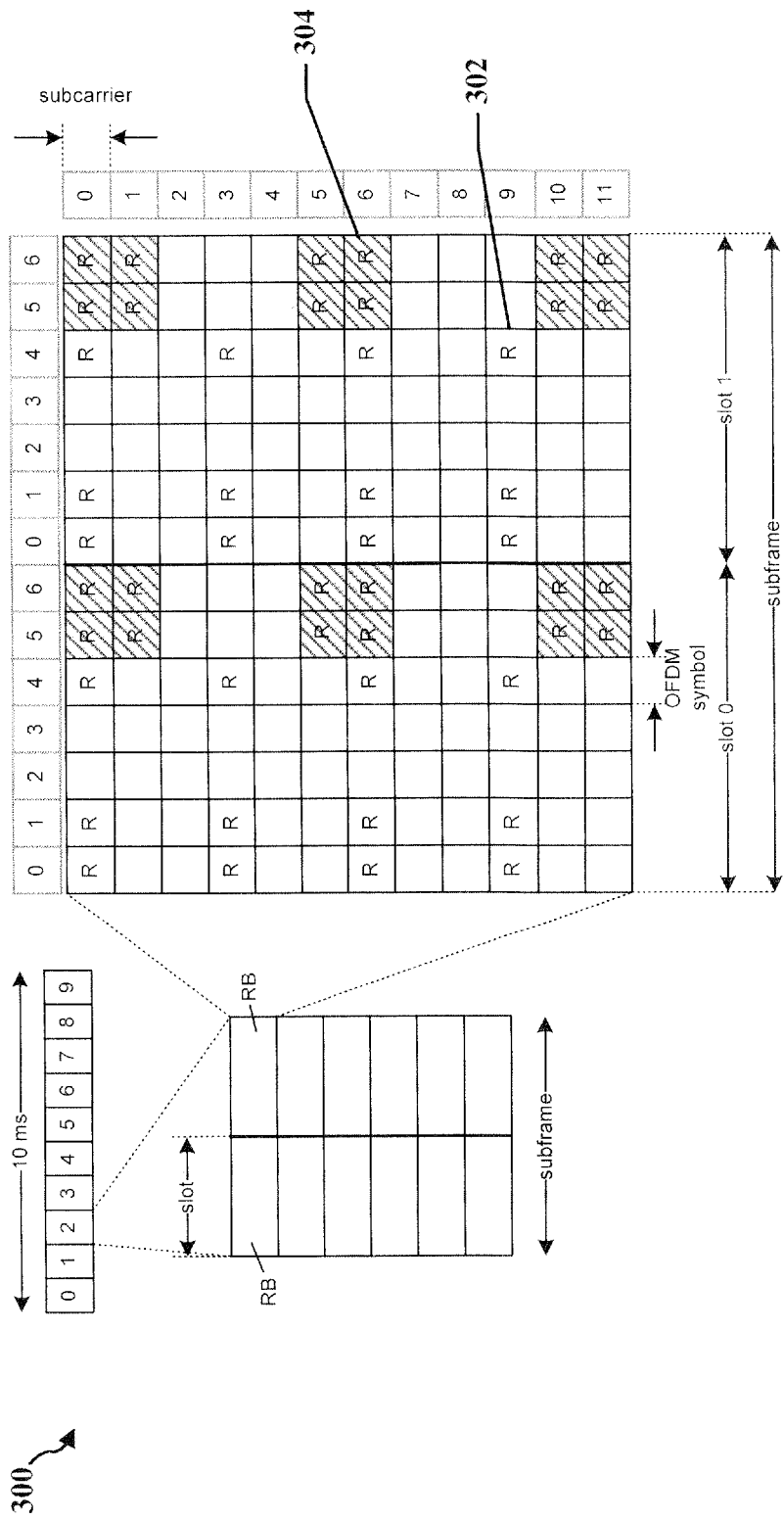
FIG. 3 is a diagram illustrating an example of a frame structure for use in an access network.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
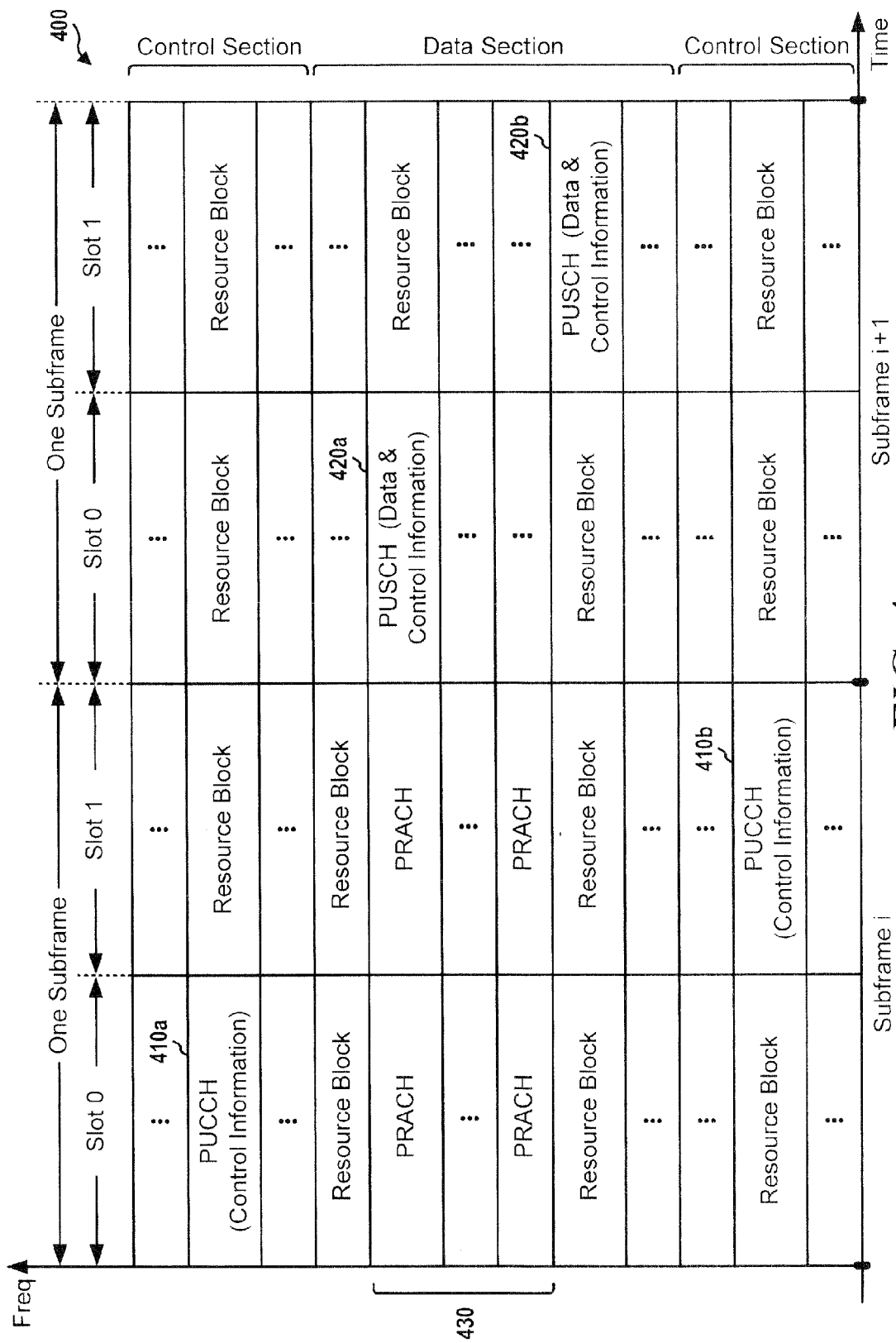
FIG. 4 shows an exemplary format for the UL in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
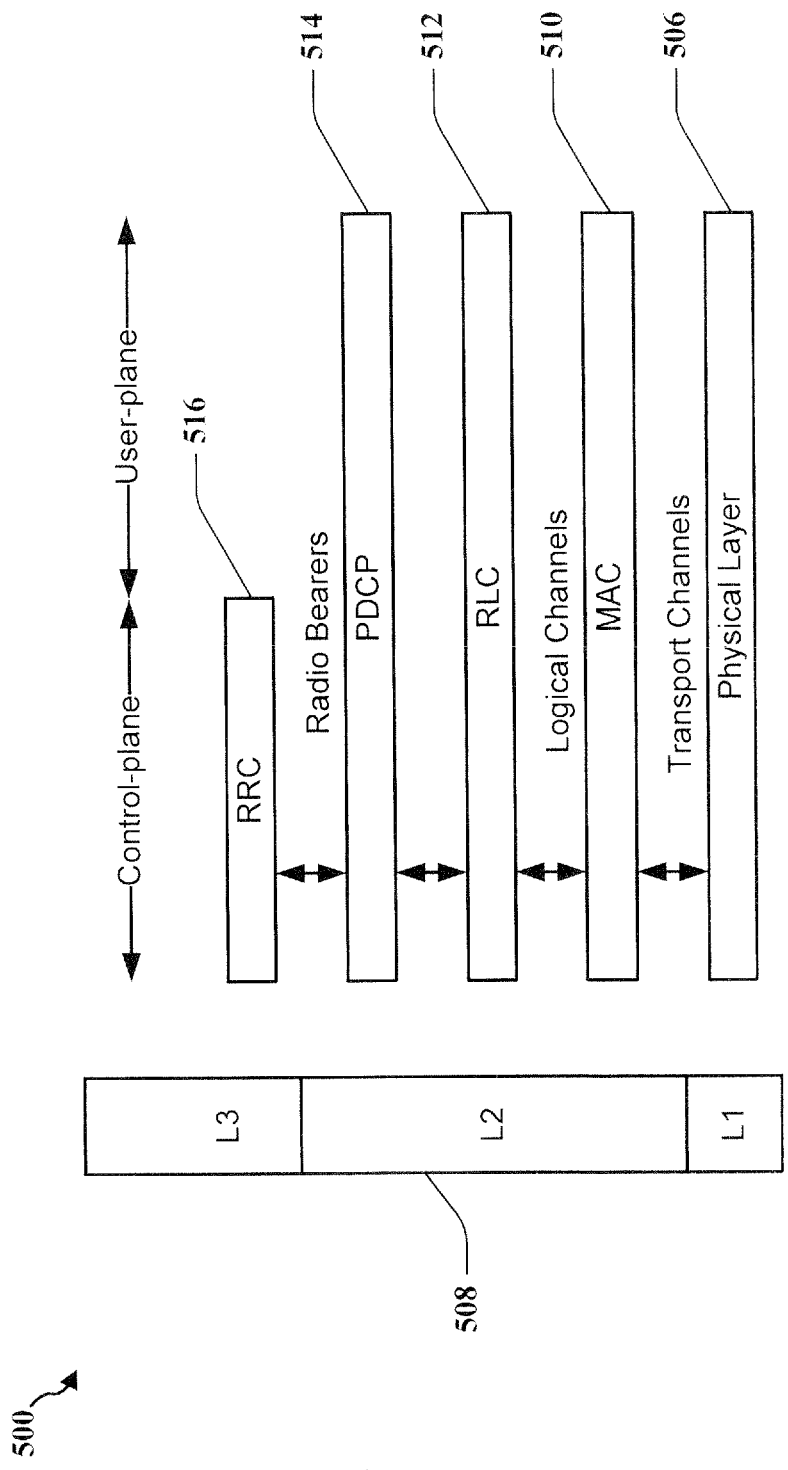
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
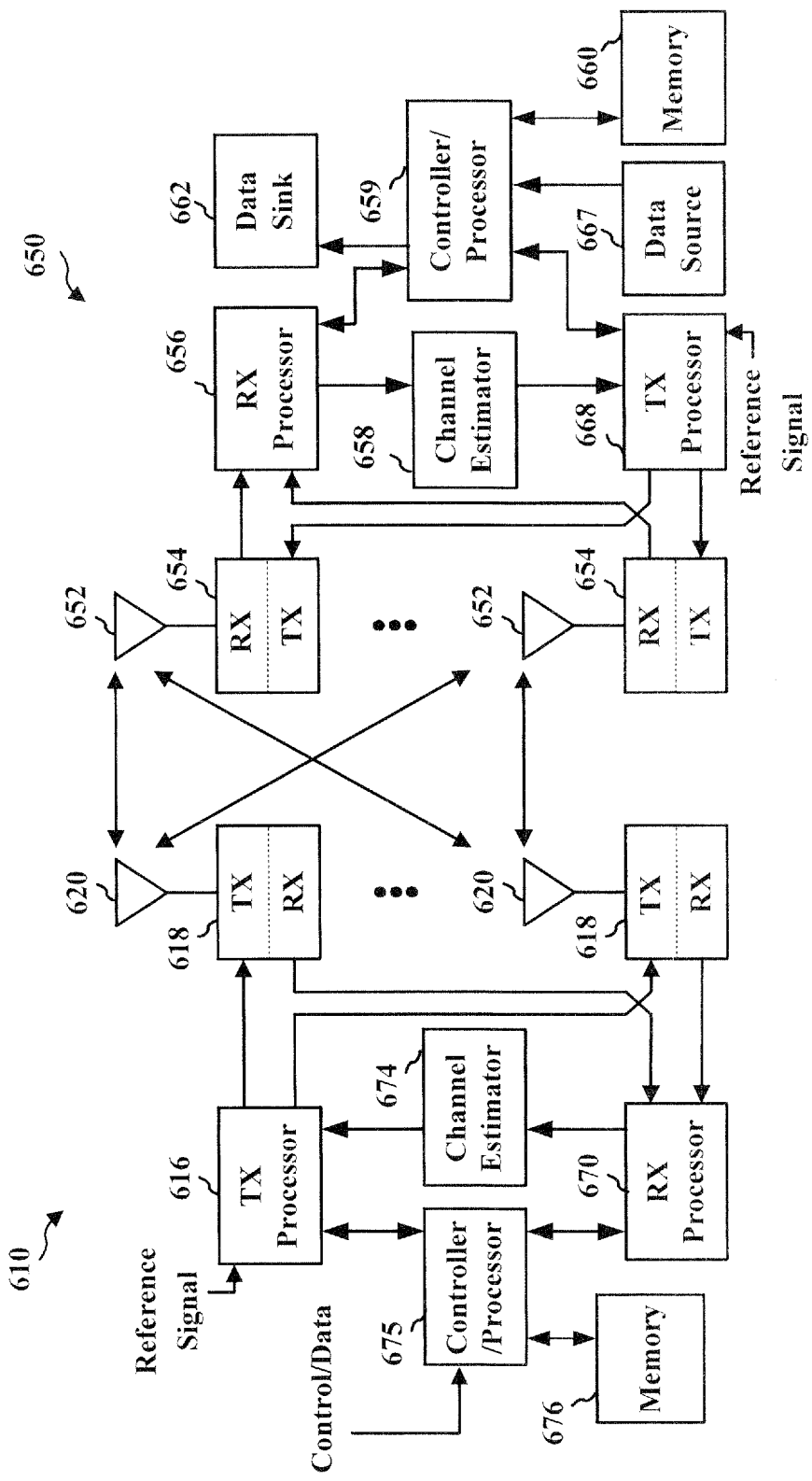
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
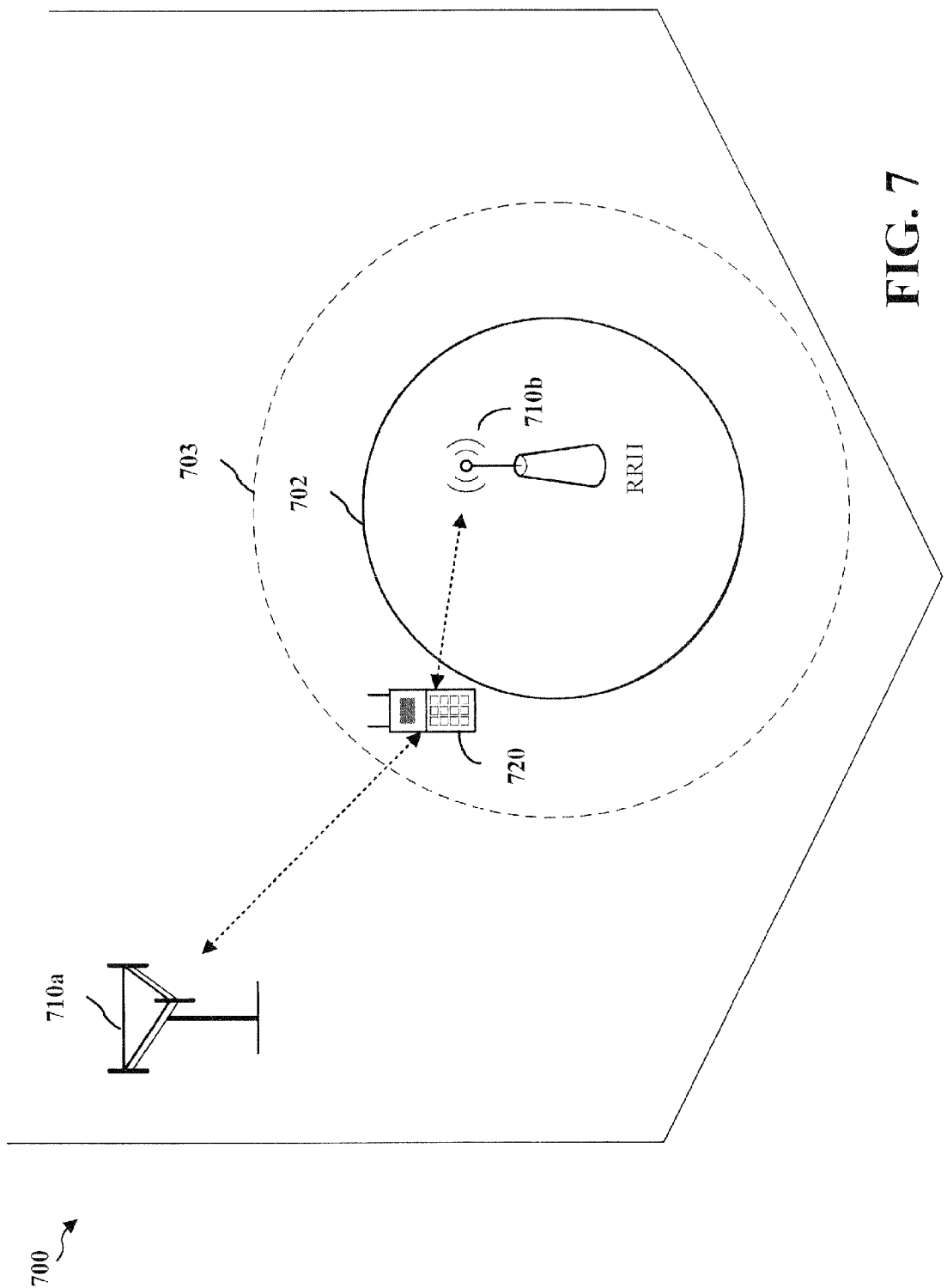
FIG. 7 is a diagram illustrating a range expanded cellular region in a heterogeneous network.

FIG. 7 is a diagram 700 illustrating a range expanded cellular region in a heterogeneous network. A lower power class eNB, such as the RRH 710*b*, may have a range expanded cellular region 703 that is expanded from the cellular region 702 through enhanced inter-cell interference coordination between the RRH 710*b* and the macro eNB 710*a* and through interference cancelation performed by the UE 720. In enhanced inter-cell interference coordination, the RRH 710*b* receives information from the macro eNB 710*a* regarding an interference condition of the UE 720. The information allows the RRH 710*b* to serve the UE 720 in the range expanded cellular region 703 and to accept a handoff of the UE 720 from the macro eNB 710*a* as the UE 720 enters the range expanded cellular region 703.

Figure 8:
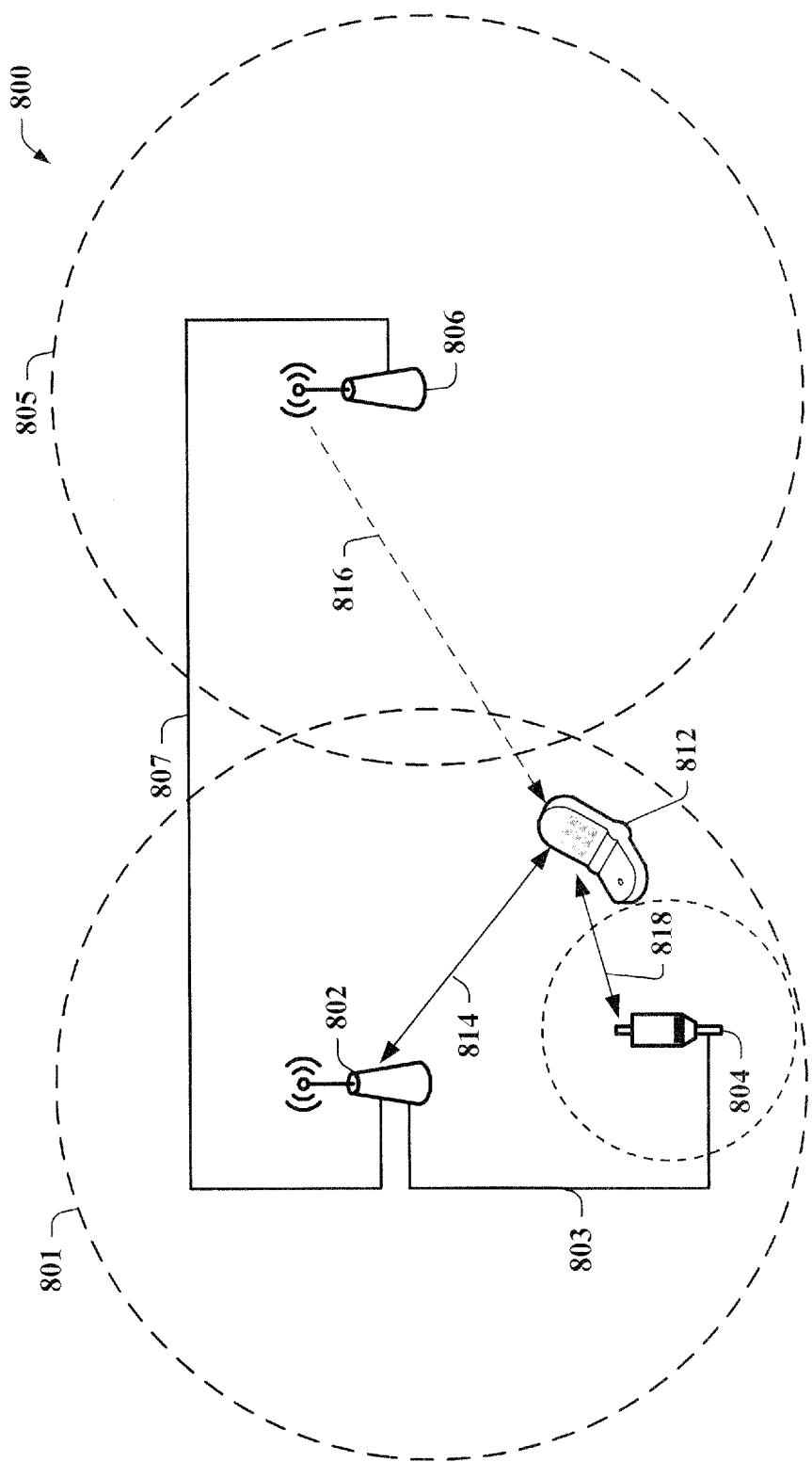
FIG. 8 is a diagram illustrating an example Macro eNB/RRH CoMP configuration in an access network.

FIG. 8 is a diagram illustrating an example Macro eNB and RRH configuration in access network 800. Access network 800 may include multiple clusters 801 of CoMP transmission points. A COMP cluster 801 may include one or more macro eNBs 802 and one or more RRHs 804. As used herein, the CoMP cluster may be referenced to as heterogeneous where entity 804 operates with reduced transmit power, and the CoMP cluster may be referenced to as homogenous where entity 804 transmits with the same transmit power as another macro eNB. For both homogeneous and heterogeneous deployments, there may be one or more RRHs 804. In one aspect, macro eNB 802 and RRHs 804 may be connected 806 through fiber cable 803, X2 backhaul 807, etc. Generally, UE 812 may receive service from access network 800. In one aspect, a CRS pattern is common across a CoMP cluster 801, e.g., macro eNB 802 and RRHs 804 may transmit using a common CRS pattern. Further, access network 800 may include one or more other CoMP cluster 805 including one or more macro eNB/RRHs 806. In operation, CSI feedback may be obtained to assist UE 812 in communicating with macro eNB 802 and/or RRH 804 including information associated with interference 816 from another CoMP cluster 805.

In one aspect of UE 812, UE 812 may be enabled to use a wireless protocol for communications with the CoMP cluster 801. Such communication protocols may include, but are not limited to, LTE release 8, LTE release 9, LTE release 10, LTE release 11, etc. To provide service to UE 812, channel estimation parameters may be obtained for a channel 814 to potentially be used between UE 812 and macro eNB 802, and/or for a channel 818 between UE 812 and RRH 804, and interference estimation parameters may be obtained to measure interference 816. In one aspect, interference 816 may potentially originate from other RRHs 804, macro eNB 802, and/or other CoMP clusters 805. Various schemes for configuring resource element patterns for various resource pattern groups (e.g., CoMP clusters) to allow a UE perform channel estimation and interference estimation are now presented.

Figure 9:
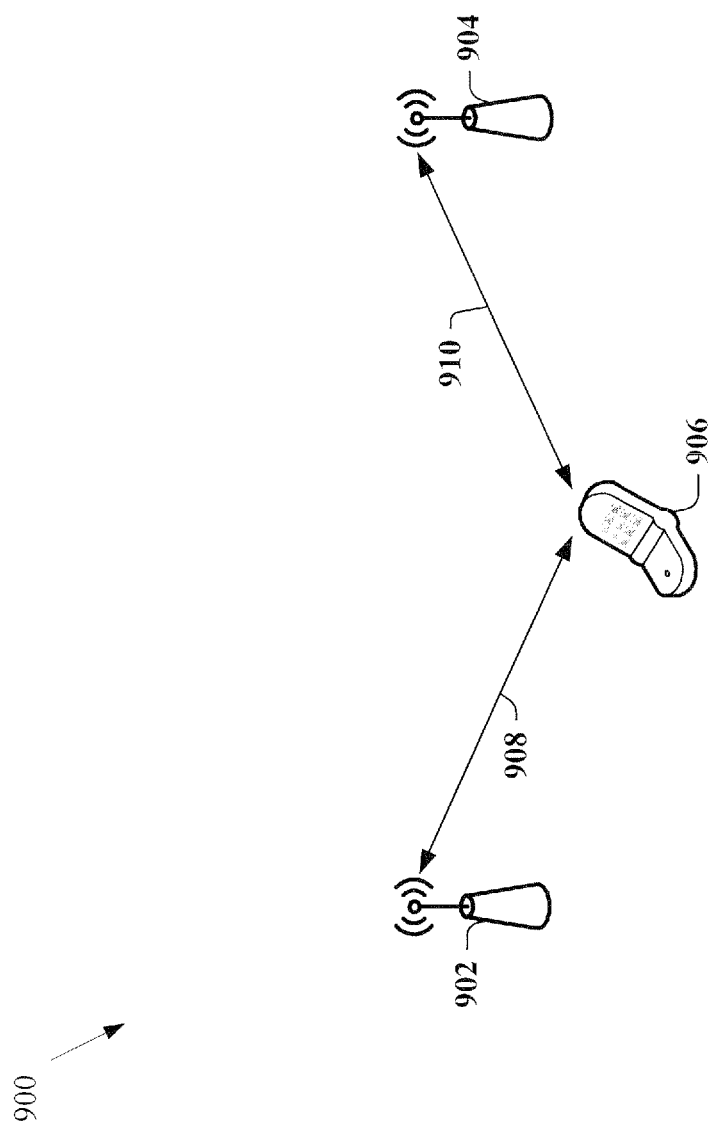
FIG. 9 is a diagram illustrating another example Macro eNB/RRH CoMP configuration in an access network.

FIG. 9 is a diagram illustrating an example access network 900 in which UE 906 may perform channel state measurements associated with multiple possible serving transmission points (902, 904). In one aspect, transmission points (902, 904) may be coordinated to operate as a CoMP cluster. Access network 900 may include support for multiple CoMP schemes including coordinated scheduling and/or coordinated beamforming, dynamic point selection (DPS), coherent and/or non-coherent joint transmission (JT), etc. Further, access network 900 may provide support for homogeneous and/or heterogeneous CoMP cluster operations.

In one aspect, CSI feedback reporting encompasses channel and interference measurement both of which may be facilitated through a combination of reference signals, including one or more Channel State Information Reference Signals (CSI-RS) and one or more Common Reference Signal (CRS). As used herein, a CSI-RS may be differentiated into non-zero power and zero-power CSI-RS. The non-zero power CSI-RS may include actual pilot transmissions with non-zero power that may be received by a UE 906 and used to measure channel and/or interference conditions. The zero-power CSI-RS, on the other hand, may represent one or more muted resource elements. Such muting may be used for interference measurement. The configuration of both zero-power and non-zero power CSI-RS resources may be UE 906 specific. Further, for a specific UE 906, multiple non-zero power CSI-RS resources and zero-power CSI-RS resources may be defined.

The CoMP schemes include CSI feedback reporting which may include multiple candidate transmission points for DPS. For coherent and/or non-coherent JT multiple transmission points (e.g., 902, 904) may contemporaneously transmit to the UE. CSI feedback reporting may be performed aperiodically and/or periodically. Aperiodic feedback may be performed on a per-request basis. Such aperiodic feedback may be triggered in access network 900 through a grant on PDCCH. Aperiodic CSI feedback reporting may be transmitted by UE 906 using an uplink data transmission (e.g., on PUSCH), thereby allowing for larger payload transmissions than would be available on the uplink control channel (e.g., PUCCH). Periodic feedback may include one or more reporting modes, and may follow a specific semi-statically configured timeline. Periodic CSI feedback reporting may be transmitted by UE 906 using the PUCCH, which allows for a more limited payload compared to the payload available for aperiodic feedback.

A UE may send multiple CSI feedback reports that are computed based on different sets of reference signal resources. Each CSI feedback report may include channel measurement, interference measurement, or any combination thereof. Feedback reporting using different sets of reference signal resources is useful as these reference signals may be indicative of different candidate transmission alternatives from which the network may select. For example, in one aspect, the UE 906 may be served either by transmission point 902 or by transmission point 904 as part of a DPS scheme. In such an aspect, UE 906 may be configured to perform measurements associated with two separate non-zero power CSI-RS resources for channel measurement. Further, UE 906 may report two sets of CSI reports, each indicative for one of the serving alternatives. Similar to the above channel measurement options, the UE 906 may perform various interference measurements for the purpose of CSI feedback reporting (e.g., which zero-power CSI-RS resources to use when performing interference measurements).

Signaling for CSI measurement and reporting configurations may include use of one or more resource pattern groups. Multiple groups of reference signal patterns may be used and these groups may constitute separate feedback reporting instances for which CSI feedback is reported. CSI reports for different groups may be indicative of different configurations of channel and/or interference measurement. As such, CSI reports for different groups may differ substantially. For each resource pattern group, a first and a second resource element pattern may be considered. The first resource element pattern may be used for channel measurement and may use one or more non-zero power CSI-RS resources. In an optional aspect, usage of a CRS pattern may also be considered. The second resource element pattern may be used for interference measurement and may include zero-power CSI-RS resources and/or CRS. Non-zero power CSI-RS resources may also be used for interference measurement, e.g., after subtracting the known pilot transmissions. The UE 906 may be informed of which CSI-RS resources to use through either explicit or implicit signaling, or a combination thereof. The first resource element pattern of different resource pattern groups may or may not correspond to the same CSI-RS resources. Similarly, the second resource element pattern of different resource pattern groups may or may not correspond to the same CSI-RS resources. For example, in one aspect, two resource pattern groups may be considered where both groups may have first resource element patterns that correspond to the same CSI-RS resources used for channel measurement while the groups may have different configurations for the second resource element pattern used for interference measurement.

Where explicit signaling is used, the UE 906 may be signaled through a new field which CSI-RS resource(s) should be used. Further, where explicit (e.g., dedicated) signaling is used, interference measurement resources may be signaled separately from the channel measurement resources through a combination of RRC and/or dynamic signaling. In one aspect, dynamic signaling may complement RRC signaling. For example, a total of four resources may be configured in RRC signaling, and dynamically signaling may include 2 bits; the 2 bits may indicate which of the RRC signaled resources the UE 906 should measure.

Where implicit signaling is used, the UE 906 may infer the one or more CSI-RS resources to use from the subframe in which the report is requested. The UE 906 may then combine the channel and interference measurements (908, 910) associated with each of the multiple transmission points (902, 904) into a single CSI report for each transmission point (902, 904) that is conveyed to the network.

For aperiodic feedback, the index of the one or more configured CSI-RS resources may be signaled using dynamically signaling. In one aspect, a combination of RRC and dynamic signaling can be used to configure which channel/interference resource the UE 906 should measure. As discussed supra, multiple groups of reference signal resources may be configured to enable CSI reporting indicative of different transmission alternatives. Each of these groups may include different channel and/or interference measurement resource patterns. Aperiodic reporting may include CSI computed based on different resource patterns for interference measurement. For example, even if a single reference signal pattern is configured for channel measurement, multiple CSI-RS resources may be configured for interference estimation in a reference subframe. UE 906 may generate separate aperiodic CSI feedback reports using these different resource patterns for interference measurement. Furthermore, where multiple resource pattern groups are measured, additional signaling may be used to convey to the UE 906 whether to compute rank indication, precoding matrix, and channel quality (RI/PMI/CQI) for each group or whether to report a subset of RI/PMI/CQI in certain CSI feedback reports. For example, UE 906 may report all of RI/PMI/CQI for one group, but only CQI for another group. In one aspect, the encoding of the CSI reports corresponding to different groups may be performed jointly to reduce feedback payload. For example, additional CQI reporting may be encoded as an offset (delta CQI) compared to an absolute CQI value in another report. In another aspect, additional CQI may be reported on a wideband and/or per-subband basis. In another aspect, for aperiodic reporting, the reference resource may be defined based on the subframe in which the request for the aperiodic CSI reports was received. An additional offset may apply be applied to capture processing delays. For example, based on the subframe in which the request for an aperiodic CSI report is received, a reference resource subframe may be determined. This determination may also depend on other parameters such as but not limited to what type of grant has triggered the aperiodic feedback request. In line with the reference signal resource patterns that fall into the reference subframe, one or more CSI feedback reports may be sent by the UE. In one aspect, a UE may be subject to an upper limit on how many resource patterns may be reported. In such an aspect, this upper limit may be configured through RRC signaling.

For periodic feedback, the one or more CSI-RS resources may be signaled as part of a reporting mode configuration. In one aspect, periodic feedback may report different channel/interference measurement configurations in separate reporting instances. In such an aspect, configuration of CSI-RS resources for channel/interference measurement can be made part of a semi-static configuration of the reporting mode. In another aspect, the UE 906 may determine, at least partially, what reference signal pattern groups to report in a certain periodic feedback reporting instance. In such an aspect, the UE 906 may report only the best (with respect to channel state information) reference signal pattern group at a time. The UE 906 may indicate as part of the report which reference signal pattern group was reported. In another aspect, the UE may cycle across several combinations in a pattern that is part of the feedback reporting configuration.

Figure 10:
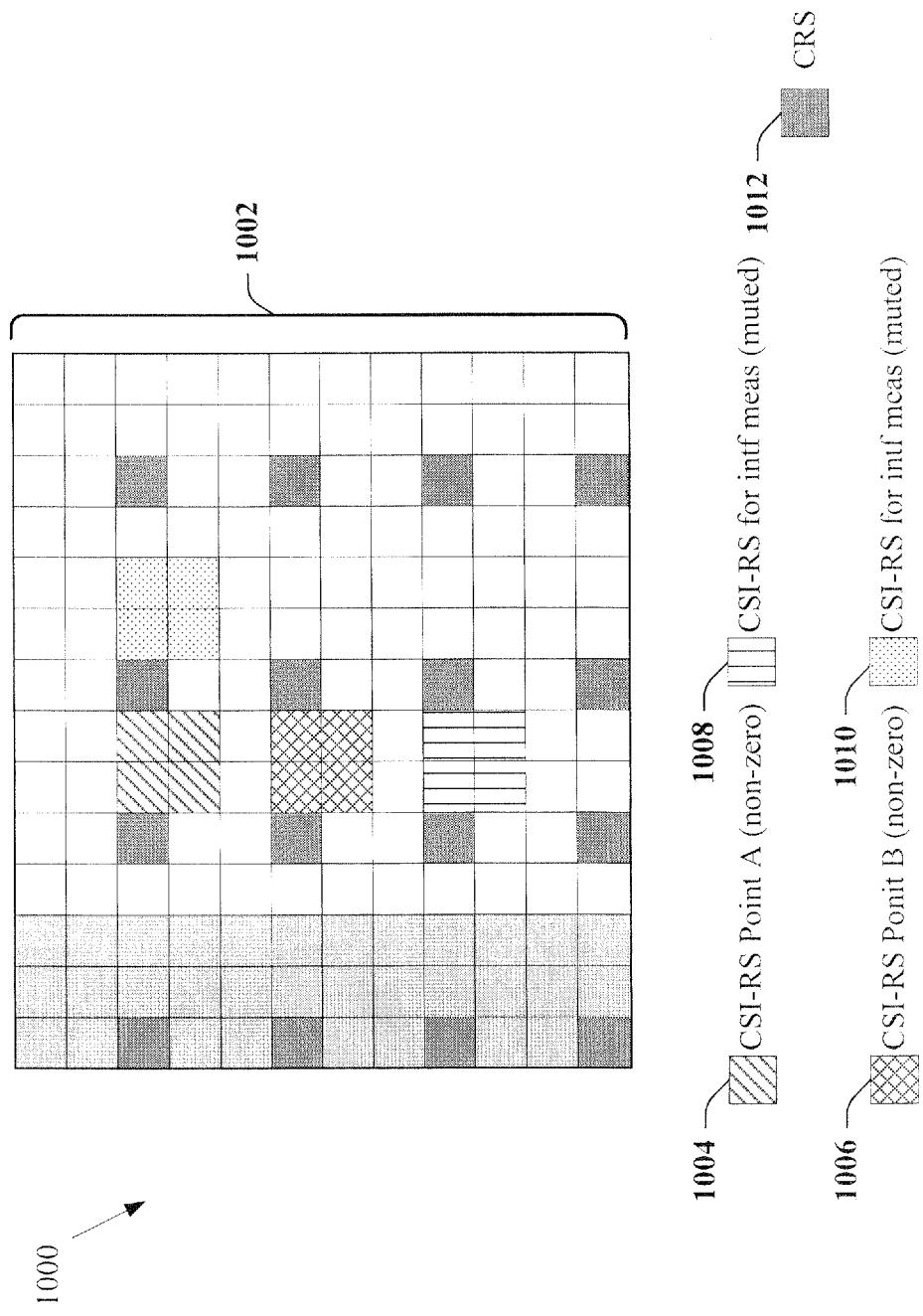
FIG. 10 is a diagram illustrating an example frame structure and resource element configuration to enable CSI measurements according to an aspect.
Figure 11:
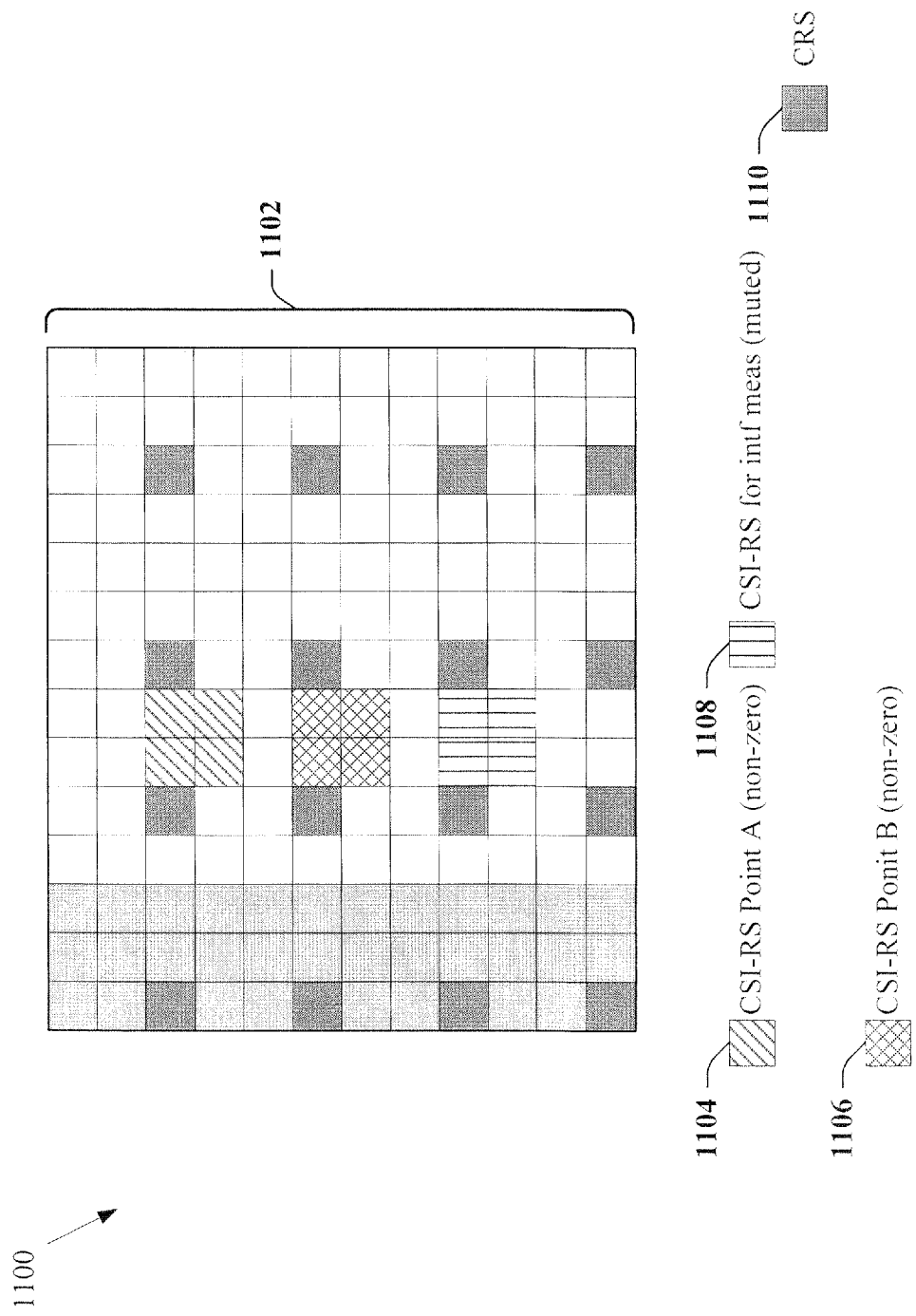
FIG. 11 is a diagram illustrating another example frame structure and resource element configuration to enable CSI measurements according to an aspect.

FIGS. 10 and 11 provide example CoMP schemes for CSI feedback reporting.

FIG. 10 is a diagram illustrating an example frame structure 1000 and resource element configuration 1002 to enable CSI measurements. Resource element configuration 1002 may include one or more resource elements 1004 allocated for channel estimation associated with a first transmission point (e.g., transmission point 902), one or more resources elements 1006 allocated for channel estimation associated with a second transmission point (e.g., transmission point 904), one or more resources elements 1008 allocated for interference estimation associated with a first transmission point (e.g., transmission point 902), one or more resources elements 1010 allocated for interference estimation associated with a second transmission point (e.g., transmission point 904), and one or more resources elements 1012 for a common reference signal (CRS).

Where CSI-RS resource configuration information is communicated through an implicit configuration, a linkage of channel and interference measurement resources implies that the interference measurement resources (1008, 1010) may be derived from the channel measurement resources (1004, 1006) configuration. In one aspect, implicit configuration may include mapping of channel and interference resources using a one-to-one mapping. In such an aspect, for any non-zero power CSI-RS resource for channel estimation (1004, 1006), there may be a dedicated interference measurement CSI-RS resource (1008, 1010). An interference measurement resource may be zero-power (e.g., muted) and/or non-zero power (e.g., not muted). Where the interference measurement resource is non-zero power, the UE (e.g., UE 906) may subtract one or more known pilot signals and use the resource elements for interference estimation. In such an aspect, separate signaling may include pilot information, pre-coding information, etc.

In another aspect, implicit configuration may include mapping of channel and interference resources using a one-to-many mapping. In such an aspect, multiple muted CSI-RS resources may be assigned for interference estimation without introducing ambiguity. In other words, a mapping from each channel estimation measurement resource (1004) to the set of interference measurement resources (1008, 1010) could be a direct mapping. Further, non-zero power CSI-RS resources (1004, 1006) may be used to supplement interference estimation by subtracting one or more known pilots from resource elements initially allocated to channel estimation and reusing the resource elements for interference estimation. In one aspect, mapping between channel and interference measurements resource elements may be different depending on a subframe, subframe set and/or subframe type.

As depicted in FIG. 10, feedback associated with a first transmission point (e.g., transmission point 902) may be obtained using resource element pattern 1004 for channel estimation and resource element pattern 1008 for interference estimation. Further, feedback associated with a second transmission point (e.g., transmission point 904) may be obtained using resource element pattern 1006 for channel estimation and resource element pattern 1010 for interference estimation. In one aspect, CRS 1012 may be used in combination with CSI-RS for interference estimation.

One of ordinary skill in the art would appreciate that although the above discuss refers to resource element patterns corresponding to individual transmission points, the disclosure also covers one or more other configurations. For example, the resource elements 1004, 1006 may not necessarily correspond a first transmission point and second transmission point, respectively. Rather, in one aspect, a single resource element pattern 1004 may span more than a single transmission point. Further, the specific mapping of CSI-RS ports to transmission points may be transparent to the UE.

FIG. 11 is a diagram illustrating an example frame structure 1100 and resource element configuration 1102 to enable CSI measurements. Resource element configuration 1102 may include one or more resources elements 1104 allocated for channel estimation associated with a first transmission point (e.g., transmission point 902), one or more resources elements 1106 allocated for channel estimation associated with a second transmission point (e.g., transmission point 904), one or more resources elements 1108 allocated for interference estimation to be shared among multiple transmission points (e.g., transmission point 902, 904), and one or more resources elements 1110 for a common reference signal (CRS).

Interference measurement resources 1108 sharing among multiple channel measurement resources allows for reduced system overhead. In an aspect in which two transmission points (e.g., 902, 904) are neighboring points, the interference measured on 1108 may include interference from points other than these two. However, in such as case, if the feedback report for either transmission point is computed using the shared interference measurement resource 1108, interference from the other transmission point may not be measured as part of the report. This deficiency may be undesirable from a network perspective, as multiple transmission points may be active and may generate interference (e.g., one transmission point 902 may serve UE 906 while the other transmission point 904 may serve a different UE and may result in interference to UE 906). To avoid unaccounted for interference, interference from one or more other transmission points (e.g., 904) may be incorporated based on channel measurement resource patterns associated with each of the other transmission points by adding the one or more channel measurements to the interference measurement obtained from the dedicated interference measurement resource. When adding interference based on the channel measurement resource of the other transmission point, a pre-coder assumption may need to be made as the pilot present on the channel measurement resource may differ from the pre-coder that may eventually be assigned by the network. In one aspect, signaling could be added to inform the UE (e.g., 906) what pre-coder assumption to use. For example, interference may be added using a full-rank (or hard-coded) pre-coder assumption, etc. In another aspect, each transmission point may offset the received CSI report based on scheduling decisions.

The above technique of "adding-back" interference may be applied in the cases other than where CSI-RS resources for interference estimation are shared among multiple transmission points. The method could be performed based on any non-zero power CSI-RS resource by indicating that the non-zero power CSI-RS represents an interference contribution and adding it to the interference estimate obtained from the dedicated interference measurement resources. The configuration of this procedure may be signaled explicitly through a combination of RRC and/or dynamic signaling. The implicit configuration options discussed above may be applied as well.

In another aspect, configuring separate resources for each of the two channel measurement resources may not needed, and instead common resources may be used and add interference for reporting purposes may be based on the channel measurement resource of the other transmission point.

Figure 12:
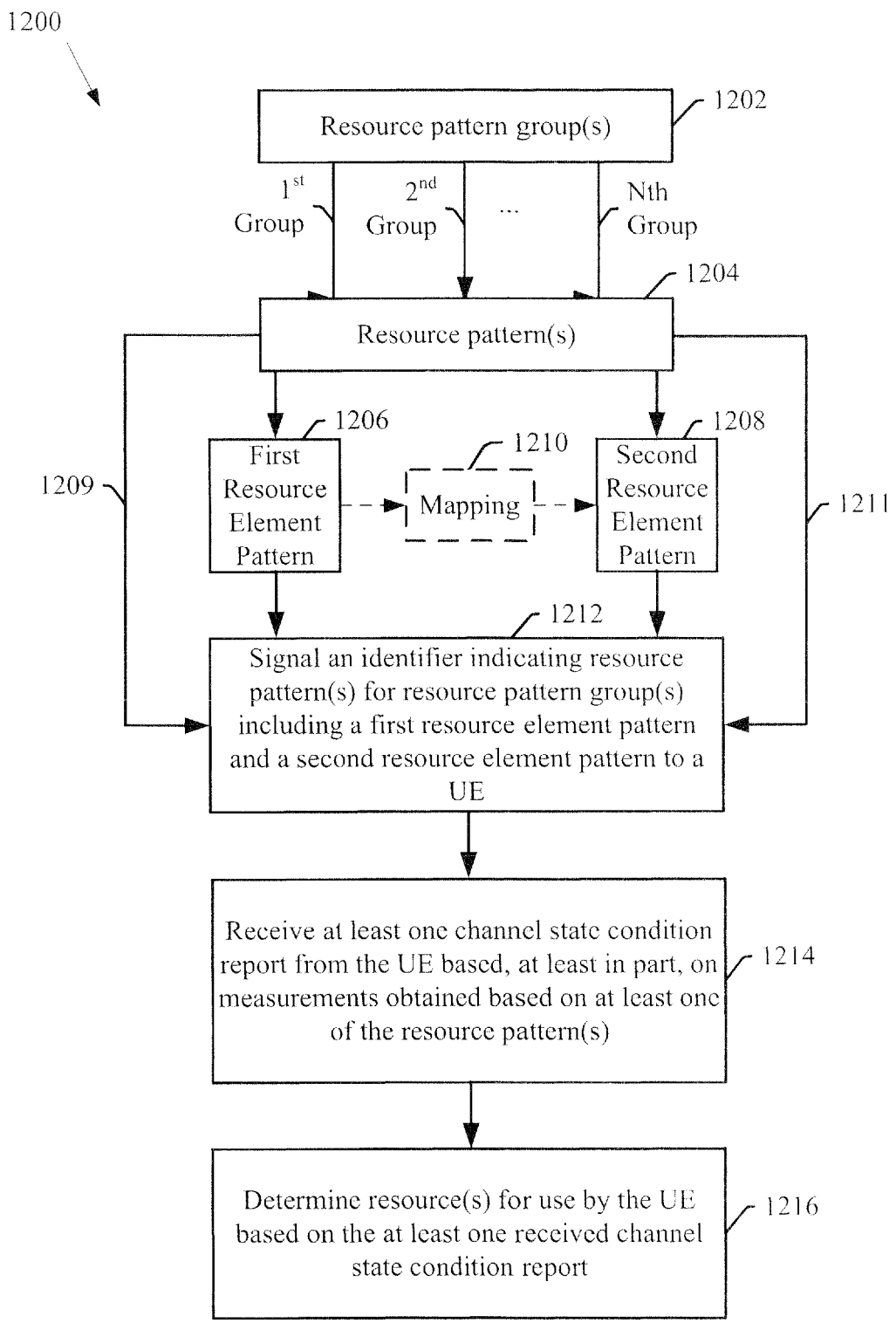
FIG. 12 is a flow chart of a method of wireless communication.

FIG. 12 is a flow chart 1200 of a method of wireless communication. In FIG. 12, boxes with dashed borders represent optional steps in the disclosed methods.

At block 1202, in a wireless environment in which multiple transmission points are available for communications, the transmission points may be grouped based on resource patterns (e.g., resource pattern groups).

At block 1204, each of the transmission point groups (e.g., $1^{st}$ group, $2^{nd}$ group, $N^{th}$ group, etc.) may be allocated a resource pattern. In one aspect, the resource pattern may be used for signaling as part of CSI feedback reporting. Further, each resource pattern group may include a first resource element pattern (block 1206) and a second resource element pattern (block 1208). In optional aspect, there may be a mapping (e.g., implicit linkage) between the first and second resource element patterns. Such mapping may reduce signaling overhead thereby improving system performance.

At block 1212, an identifier indicating resource patterns (block 1204) for resource pattern groups (block 1202) each of which includes a first resource element pattern (block 1206) and a second resource element pattern (block 1208) may be signaled to a UE by an eNB. In one aspect, the first resource pattern and second resource pattern are CSI-RS patterns. In one aspect, the identifier used to indicate each resource pattern for each resource pattern group is signaled using at least one of RRC, dynamic signaling, etc. In such an aspect, the RRC signaling may include one or more identifier options, and the dynamic signaling may include one or more bits used to indicate which of the one or more identifiers is options is to be used. In one aspect, dynamic signaling may include a link to a bitmap indicating at least one of the resource patterns. In another aspect, a resource pattern to be used for a resource pattern group may be indicated based on a subframe on which the identifier is signaled. As discussed above, in one aspect, a second resource element pattern (block 1208) used for interference estimation may be identified through a mapping (block 1210) that indentifies the second resource element pattern based on a first resource element pattern (block 1206) used for channel estimation. Further, in such an aspect, the mapping between the first resource element pattern and the second resource element pattern may depend on a subframe on which the identifier is signaled. In one aspect, the same second resource element pattern (block 1208) may be common across multiple resource patterns (block 1204). In another aspect, the identifier may further indicate precoding information (1209) for adjusting the channel state condition report based on interference from a resource pattern that is not indicated as the possible serving resource pattern for the requested channel state condition report. In still another aspect, the identifier may further indicate a third resource pattern (1211) that may correspond to one or more common reference signal (CRS) patterns. In such an aspect, the CRS pattern may be used to measure interference from outside the resource pattern groups (e.g., inter-cluster interference).

At block 1214, the eNB may receive at least one channel state condition report based at least in part on at least one of the resource patterns signaled by the identifier. A channel state condition report may be received periodically and/or aperiodically. In one aspect, the identifier may indicate different instances of measurements are to be obtained by the UE during different subframes. In another aspect, the identifier may indicate that a best set of measurements measured by the UE should be included in the channel state condition report. In one aspect, where an aperiodic channel state condition report has been requested, channel state condition reports associated with multiple different resource pattern groups may be returned by the UE.

At block 1216, the eNB may determine one or more resources for use by the UE based on analysis of received channel state condition reports.

Figure 13:
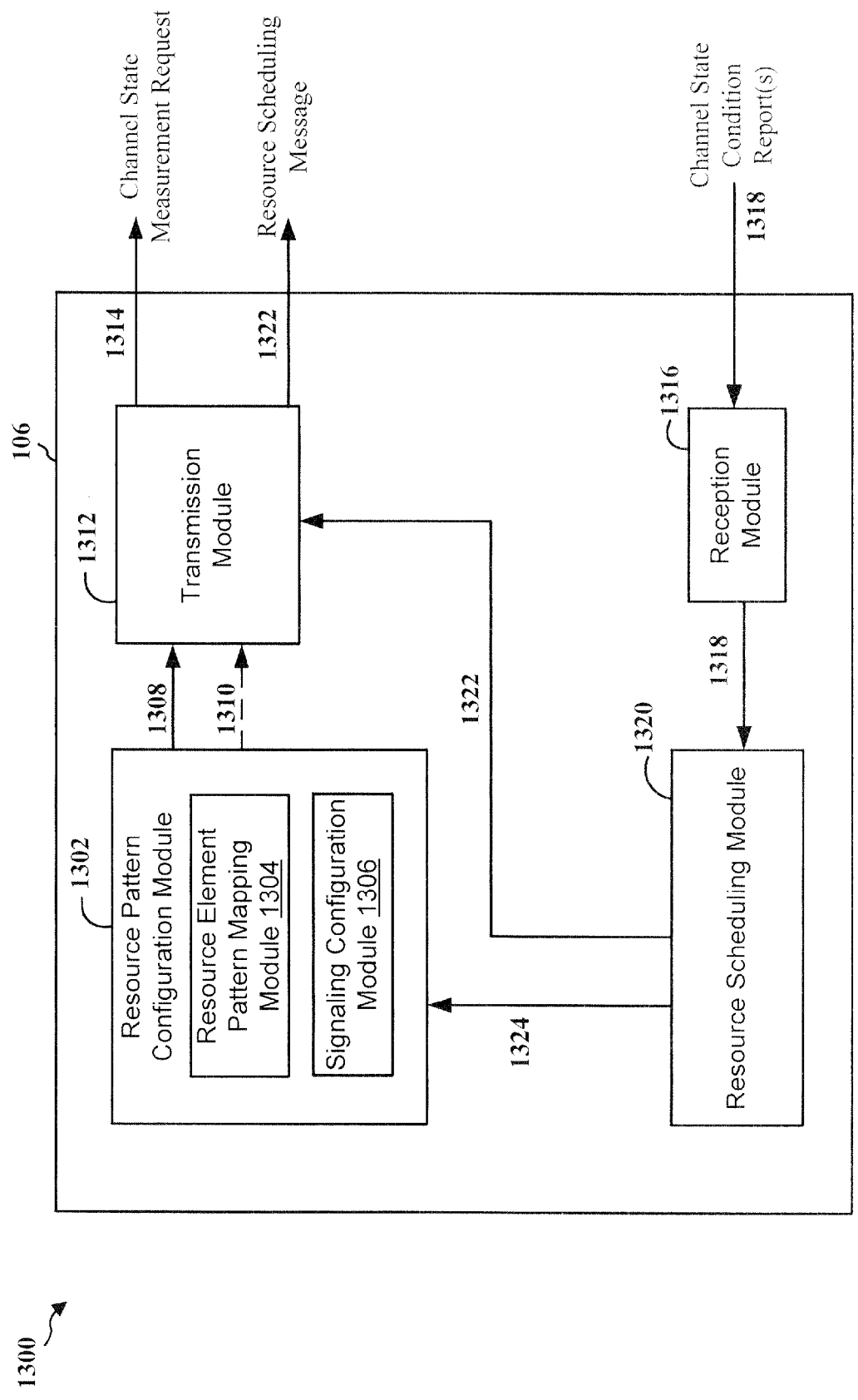
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 106. The apparatus 106 includes a module 1302 that may configure an identifier 1308 to indicate various resource patterns to assist a UE in channel state measurements. In one aspect, channel state conditions may include channel estimation and interference estimation. In one aspect, resource pattern configuration module 1302 may configure patterns on a semi-static basis. Further, resource pattern configuration module 1302 may configure a first resource element pattern to assist a UE in channel estimation measurements, and a second resource element pattern to assist a UE in channel interference measurements. In one aspect, each of the first and second resource patterns may be CSI-RS patterns. In an optional aspect, resource pattern configuration module 1302 may further configure a third resource element pattern 1310 to assist in interference estimation from outside a CoMP cluster (e.g., inter-cluster interference). In such an optional aspect, the third resource pattern 1310 may be one or more CRS patterns.

Resource pattern configuration module 1302 may further include resource element pattern mapping module 1304 that may indicate the second resource element pattern through a mapping that indentifies the second resource element pattern based on the first resource element pattern. In such an aspect, the mapping between the first resource element pattern and the second resource element pattern may depend on a subframe on which the identifier 1308 is signaled. In another aspect, resource pattern configuration module 1302 may configure resource elements patterns such that a resource element pattern used for interference is shared among multiple resource pattern groups. In such an aspect, identifier 1308 may further include instructions to account for interference from one or more other resource pattern groups.

Resource pattern configuration module 1302 may further include signaling configuration module 1306 that may indicate precoding information for adjusting a channel state condition report based on interference from either the first resource pattern group or the second resource pattern group based on which of the first or second resource pattern groups is not selected for the channel state condition report. In one aspect, signaling configuration module 1306 may further prompt apparatus 106 to use at least one of RRC signaling or dynamic signaling. In such an aspect, the RRC signaling may include one or more identifier 1308 options, and the dynamic signaling may include one or more bits used to indicate which of the one or more identifier 1308 options is to be used. In another aspect, the dynamic signaling may include a link to a bitmap indicating at least a first resource pattern and the second resource pattern for use by the UE. Further, signaling configuration module 1306 may be operable to configure additional RRC and/or dynamic signaling to specify which resources are shared resources and what interferers should be "added back" based on their channel measurement resources. Signaling configuration module 1306 may also be operable signal support of measuring interference based on the CRS.

Apparatus 106 may further include transmission module 1312 that signals the resource patterns to the UE as part of a channel state measurement request 1314.

Further, apparatus 106 may include a reception module 1316 that receives one or more channel state condition reports 1318 from the UE, and a resource scheduling module 1320 that schedules resources for use by a UE based at least in part on values included in the one or more channel state condition reports 1318. Reception module 1316 may receive periodic and/or aperiodic channel state condition reports 1318. In one aspect, where the channel state condition report 1318 is a periodic channel state condition report 1318, measurements included in the report may depend on information included in the identifier 1308. In such an aspect, the identifier may indicate different instances of measurements to be obtained for either the first or second resource pattern groups during different subframes and/or based on a subframe during which the identifier is transmitted. In another aspect, the identifier may indicate that a determined best set of measurements is to be included by the UE in the channel state condition report. In an aspect where the channel state condition report 1318 is an aperiodic report, multiple instances of measurements associated with various resource pattern groups may be received. Thereafter, resource scheduling module 1320 may communicate a resource scheduling message 1322 through transmission module 1312. Further, resource scheduling module 1320 may provide channel state feedback 1324 to resource pattern configuration module 1302 to potentially assist in generation of improved resource patterns.

The apparatus may include additional modules that perform each of the steps of the algorithm in the aforementioned flow chart FIG. 12. As such, each step in the aforementioned flow charts FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
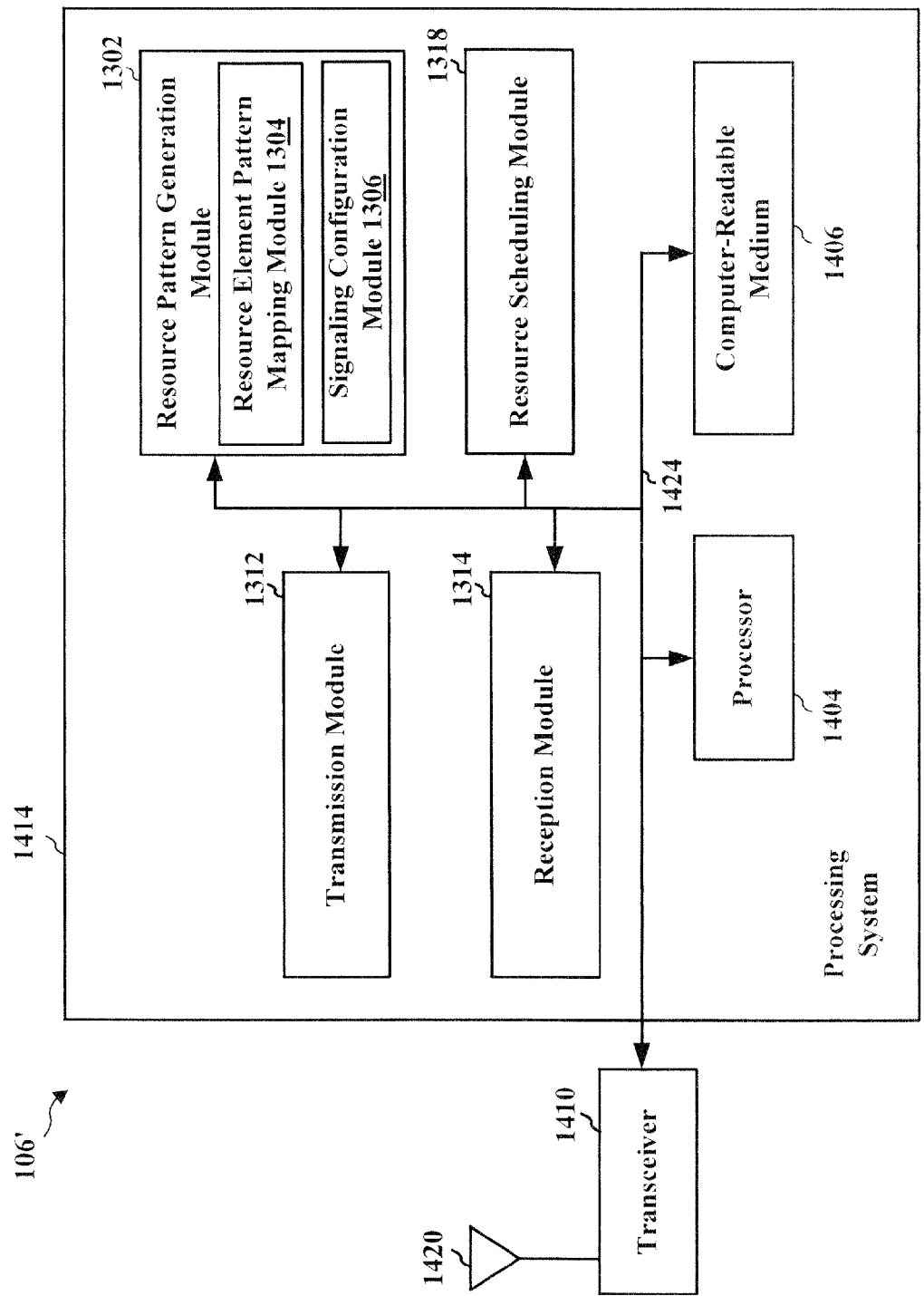
FIG. 14 is a diagram illustrating an example of a hardware implementation for an apparatus employing a processing system.

FIG. 14 is a diagram illustrating an example of a hardware implementation for an apparatus 106' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1302, 1304, 1306, 1312, 1314, 1318, and the computer-readable medium 1406. The bus 1424 may also link various other circuits such as timing sources, peripherals, voltage regulators, and power management circuits, which are well known in the art, and therefore, will not be described any further.

The apparatus includes a processing system 1414 coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes modules 1302, 1304, 1306, 1312, 1314 and 1318. The modules may be software modules running in the processor 1404, resident/stored in the computer readable medium 1406, one or more hardware modules coupled to the processor 1404, or some combination thereof. The processing system 1414 may be a component of the eNB 610 and may include the memory 676 and/or at least one of the TX processor 616, the RX processor 670, and the controller/processor 675.

Figure 15A:
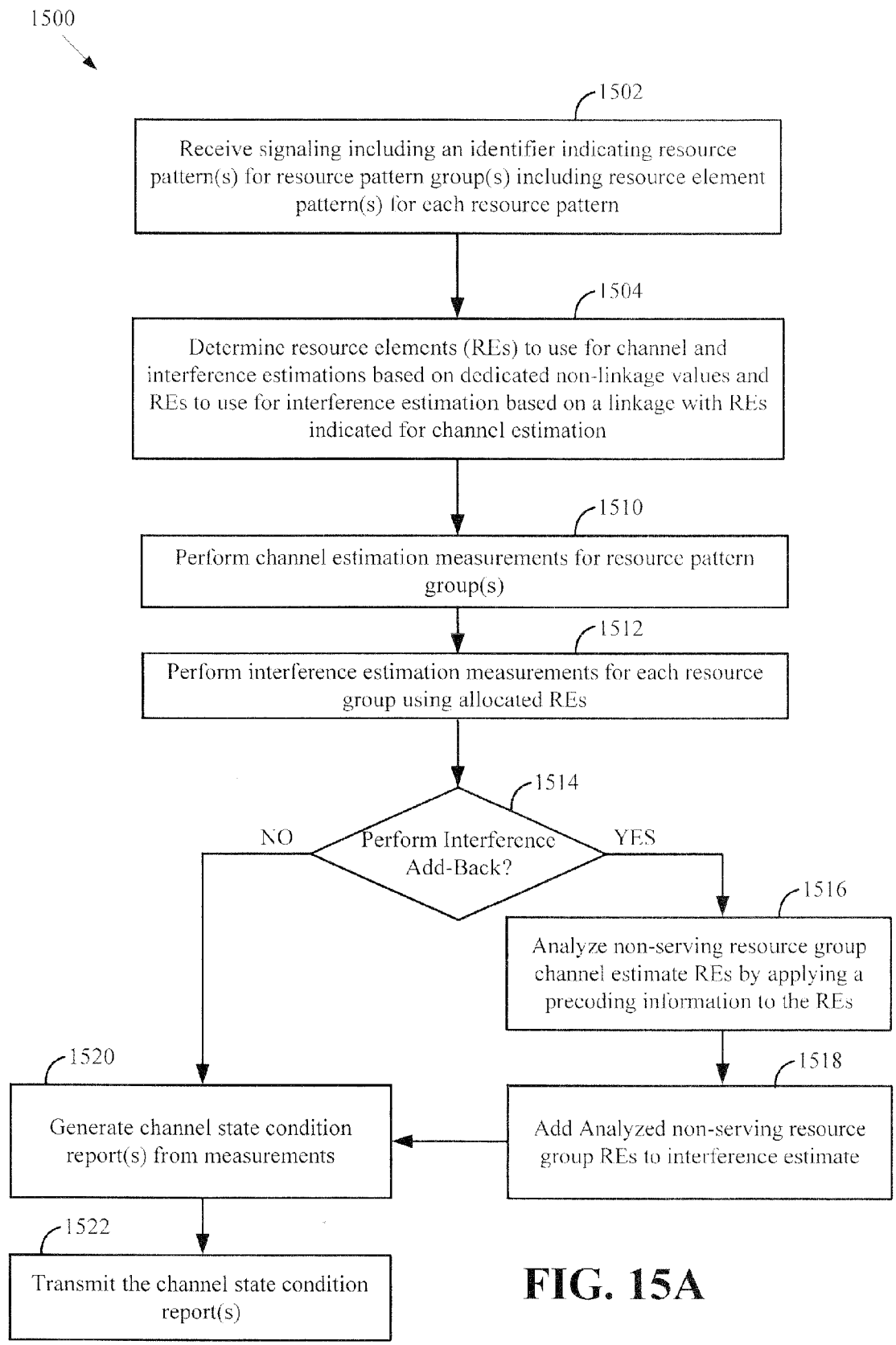
FIG. 15A is a flow chart of a method of wireless communication for a UE.
Figure 15B:
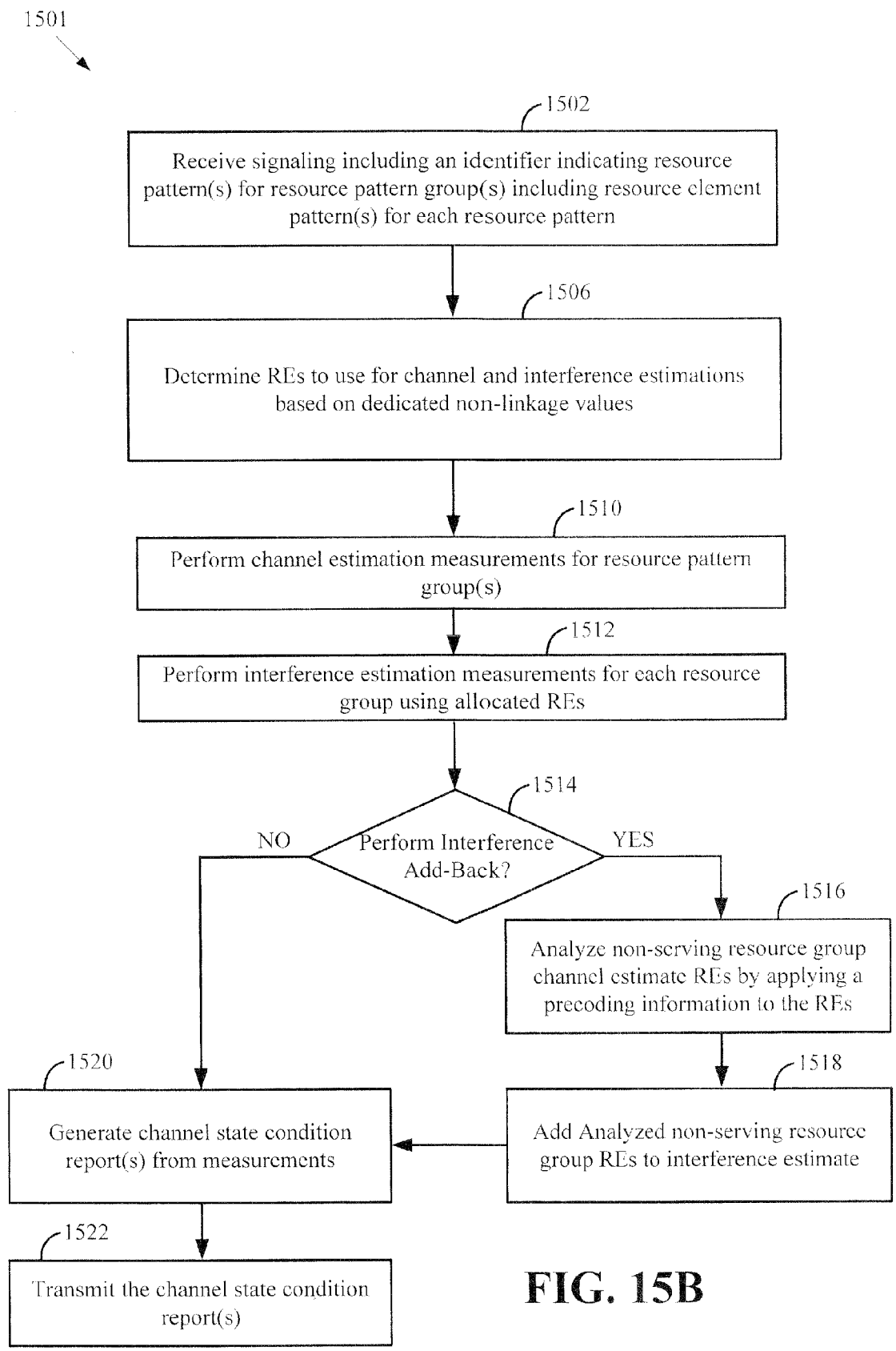
FIG. 15B is a flow chart of another method of wireless communication for a UE.
Figure 15C:
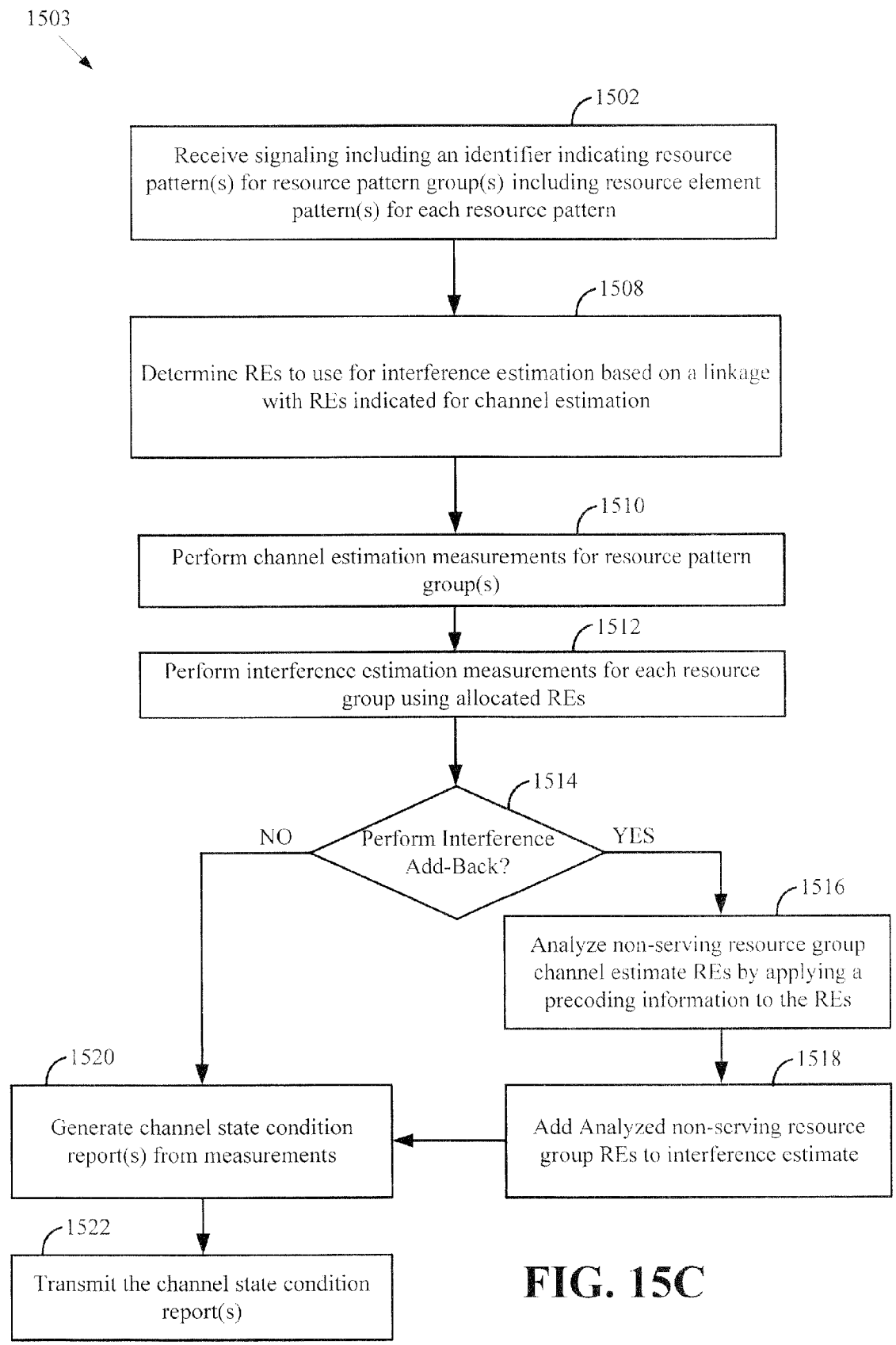
FIG. 15C is a flow chart of still another method of wireless communication for a UE.

FIGS. 15A-15C is flow charts 1500, 1501, and 1503 of methods of wireless communication for a UE. For clarity and to avoid duplicity, blocks that are common amount FIGS. 15A-15C are described once with reference to FIG. 15A.

FIG. 15A is a flow chart 1500 of a method of wireless communication for a UE.

At block 1502, a UE may receive signaling including an identifier indicating one or more resource patterns for one or more resource pattern groups including at least a first and a second resource element pattern for each resource pattern. In one aspect, the signaling may be received from a macro eNB alone, while in another aspect, the signaling may be received from any combination of the macro eNB and/or one or more RRHs. In one aspect, the first resource element pattern may be used for channel estimation, and the second resource element pattern may be used for interference estimation. In such an aspect, the first and second resource element pattern may be CSI-RS patterns. In an optional aspect, the identifier may indicate a third resource element pattern indicating one or more CRS patterns that may be used for interference estimation. In one aspect, a third resource pattern may be signaled, where the first resource pattern may be used for a channel estimation for one or more signals from within a cluster of transmission points (e.g., resource pattern group), the second resource pattern may be used for an interference estimation pattern for one or more signals from within the cluster of transmission points, and the third resource pattern may be used for an interference estimation for one or more signals from outside the set of coordinating transmission points (e.g., inter-cluster interference). Further, in one aspect, the UE may be operable to perform eICIC (enhanced Inter-Cell Interference Cancellation). In another aspect, the signaling may include multiple identifier instances. In such an aspect, the UE may determine which identifier to use based on the subframes used to transmit the signaling. In another aspect, the UE may be informed which identifier is to be used for which resource pattern group using dynamic signaling.

At block 1504, the UE may determine that one or more resource element patterns may be indicated through use of a linkage (e.g., mapping) between the first resource element pattern and the second resource element pattern and other resource elements patterns may be indicated with no linkage between the first resource element pattern and the second resource element pattern.

At block 1510, the UE may perform channel estimation measurements for each resource pattern group included in the signaling.

At block 1512, the UE may perform interference estimation measurements for each resource pattern group included in the signaling.

At block 1514, the UE may determine whether interference add-back is to be performed. If at block 1514 the UE determines that interference add-back is not to be performed, then at block 1520 the UE may generate one or more channel state condition reports based, at least in part, on both the interference estimations and the channel estimations. In one aspect, interference add-back may not be performed when each transmission point has been allocated separate resource element patterns for interference measurements.

By contrast, if at block 1514 the UE determines that interference add-back is to be performed, then at block 1516 the UE may analyze one or more other resource element patterns associated with non-zero power CSI-RS resources. Further, the analysis may include applying a signaled or predetermined precoding to these resources.

At block 1518, the UE may add-back the one or more interference estimation values from the one or more analyzed resource element patterns to generate an updated interference estimation value. As noted above, at block 1520 the UE may generate one or more channel state condition reports based, at least in part, on both the interference estimations and the channel estimations.

At block 1522, the UE may transmit one or more channel state condition reports to one or more macro eNBs and/or one or more RRHs. In one aspect, the UE may determine which resource pattern group is associated with the best channel conditions, and may transmit the determined best channel state condition report. In another aspect, the UE may select to transmit different channel state condition report instances during different subframes and/or subframes. In still another aspect where the channel state condition report is an aperiodic report (e.g., a requested measurements report), multiple channel state condition reports may be contemporaneously transmitted. In response to the channel state condition report, the UE may receive a resource scheduling message indicating which resource and/or resources are assigned to the UE.

FIG. 15B is a flow chart 1501 of a method of wireless communication for a UE. As noted above, blocks that share common description with FIG. 15A are omitted herein.

At block 1506, the UE may determine that one or more resource element patterns may be indicated through use of a linkage (e.g., mapping) between the first resource element pattern and the second resource element pattern. In other words, the UE may infer which resource element patterns to use for interference estimation based on the resource element patterns allocated for channel estimation.

FIG. 15C is a flow chart 1503 of a method of wireless communication for a UE. As noted above, blocks that share common description with FIG. 15A are omitted herein.

At block 1508, the UE may determine that one or more resource element patterns may be indicated with no linkage between the first resource element pattern and the second resource element pattern. In other words, separate dedicated resource element patterns may be allocated for channel estimation and for interference estimation.

Figure 16:
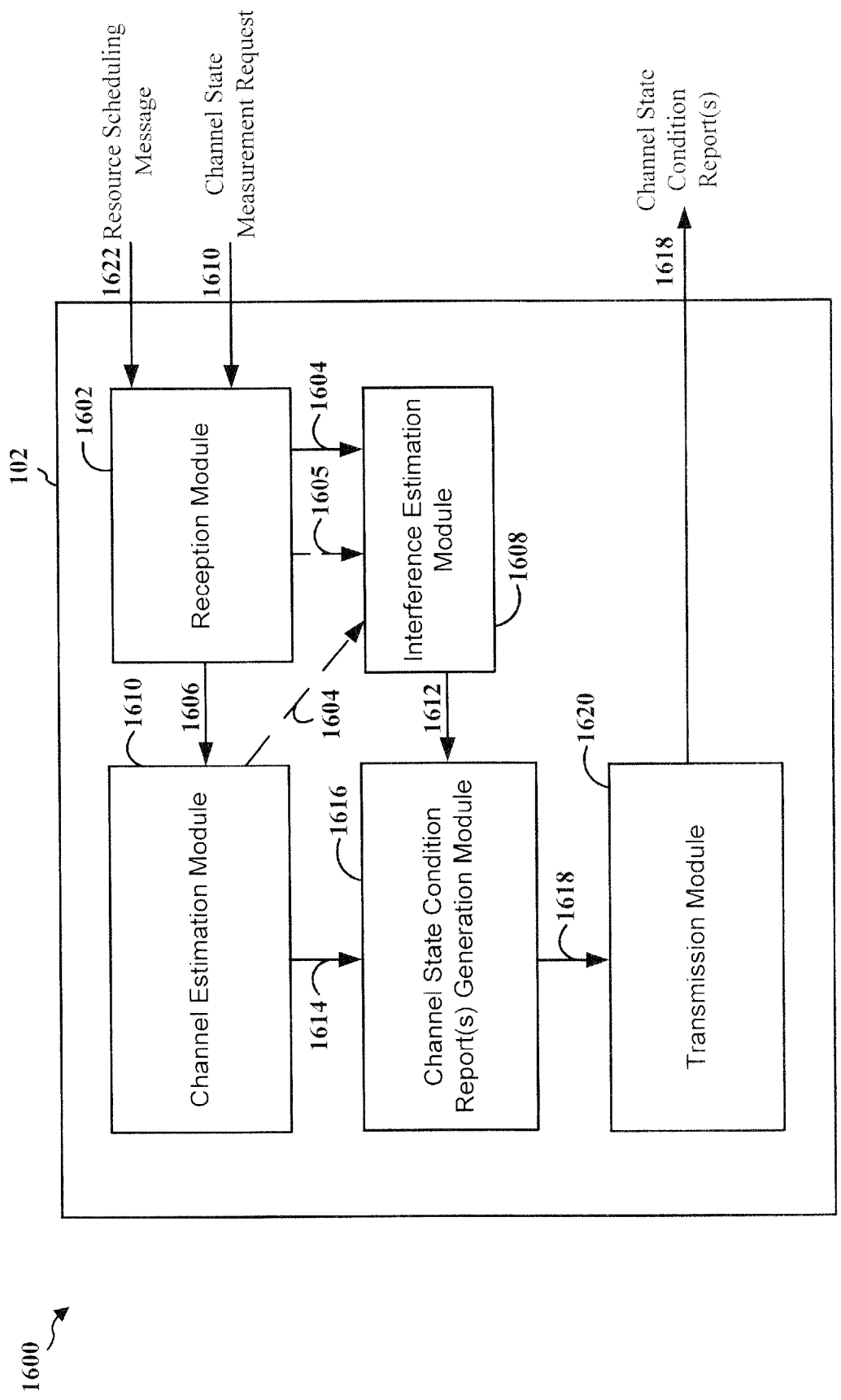
FIG. 16 is a conceptual data flow diagram illustrating the data flow between different modules/means/components in another exemplary apparatus.

FIG. 16 is a conceptual data flow diagram 1600 illustrating the data flow between different modules/means/components in an exemplary apparatus 102. The apparatus 102 includes a reception module 1602 that receives a channel state measurement request message 1610. In one aspect, the channel state measurement request message 1610 may include an identifier indicating one or more resource pattern groups, each associated with a resource pattern, and each including at least a first resource element pattern 1604 and a second resource element pattern 1606. In one aspect, the first and second resource element patterns may include CSI-RS patterns for each resource pattern group included in the channel state measurement request message 1610. In one aspect, the channel state measurement request message 1610 may include multiple identifiers. In such an aspect, the apparatus may select an identifier based on a subframe upon which the message was transmitted. In another aspect, dynamic signaling may indicate which identifier is to be used for which resource pattern group. In an optional aspect, the channel state measurement request message 1610 may further include a third resource element pattern 1605. In such an optional aspect, the third resource element pattern 1605 may include a CRS pattern for at least of the resource pattern groups included in the channel state measurement request message 1610.

Apparatus 102 may further include channel estimation module 1610 that may use the first resource element pattern 1606 to estimate channel conditions. The channel estimation value 1614 determined by channel estimation module 1610 may be communicated to channel state condition report generation module 1616. In an optional aspect, a mapping may be used to indicate a second resource element pattern 1604 used for performing interference estimation based on the first resource element pattern 1606. In such an optional aspect, the second resource element pattern 1604 may be derived from a linkage with the first resource element pattern 1606, and may be communicated to interference estimation module 1608.

Apparatus 102 may further include interference estimation module 1608 that uses knowledge of the second resource pattern 1604 to perform interference measurements. In one aspect, interference estimation module 1608 may further use the third resource element pattern to estimate interference from outside the set of coordinating transmission points (e.g., inter-cluster interference). In one aspect, a second resource element pattern may be shared among multiple resource pattern groups. In one aspect, measurements obtained for channel estimation for a second and/or multiple other resource pattern groups may be used in interference measurements for a first resource pattern group. In such an aspect, a first resource element pattern may be further processed by subtracting one or more pilot signals from the corresponding first resource element pattern resources, and the processed first resource element pattern may be used for obtaining an interference estimation value associated another resource pattern group. The interference estimation value and/or values 1612 determined by interference estimation module 1608 may be communicated to channel state condition report generation module 1616.

Apparatus 102 may further include channel state condition report generation module 1616 that may generate one or more channel state condition reports 1618. In one aspect, a channel state condition report 1618 may be generated for each resource pattern group. In one aspect, each channel state condition report 1618 may be based at least on the interference estimation value and/or values 1612 and the channel estimation value 1614.

Apparatus 102 may further include transmission module 1620 that transmits one or more channel state condition reports 1618 to the macro eNB. Transmission module 1620 may transmit the one or more channel state condition reports 1618 periodically and/or aperiodically. In one aspect, apparatus 102 may determine which resource pattern group was associated with the best channel conditions, and may use transmission module 1620 to transmit the determined best channel state condition report 1618. In another aspect, apparatus 102 may select to transmit different channel state condition report 1618 instances during different subframes and/or subframe types. In still another aspect where the channel state condition report 1618 is an aperiodic report (e.g., a requested measurements report), multiple channel state condition reports 1618 may be contemporaneously communicated to an eNB. In one aspect, reception module 1602 may receive a resource scheduling message 1622 from the macro eNB in response to the transmission of the one or more channel state condition reports 1618.

The apparatus may include additional modules that perform each of the steps of the algorithm in the aforementioned flow charts FIGS. 15A-15C. As such, each step in the aforementioned flow charts FIGS. 15A-15C may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
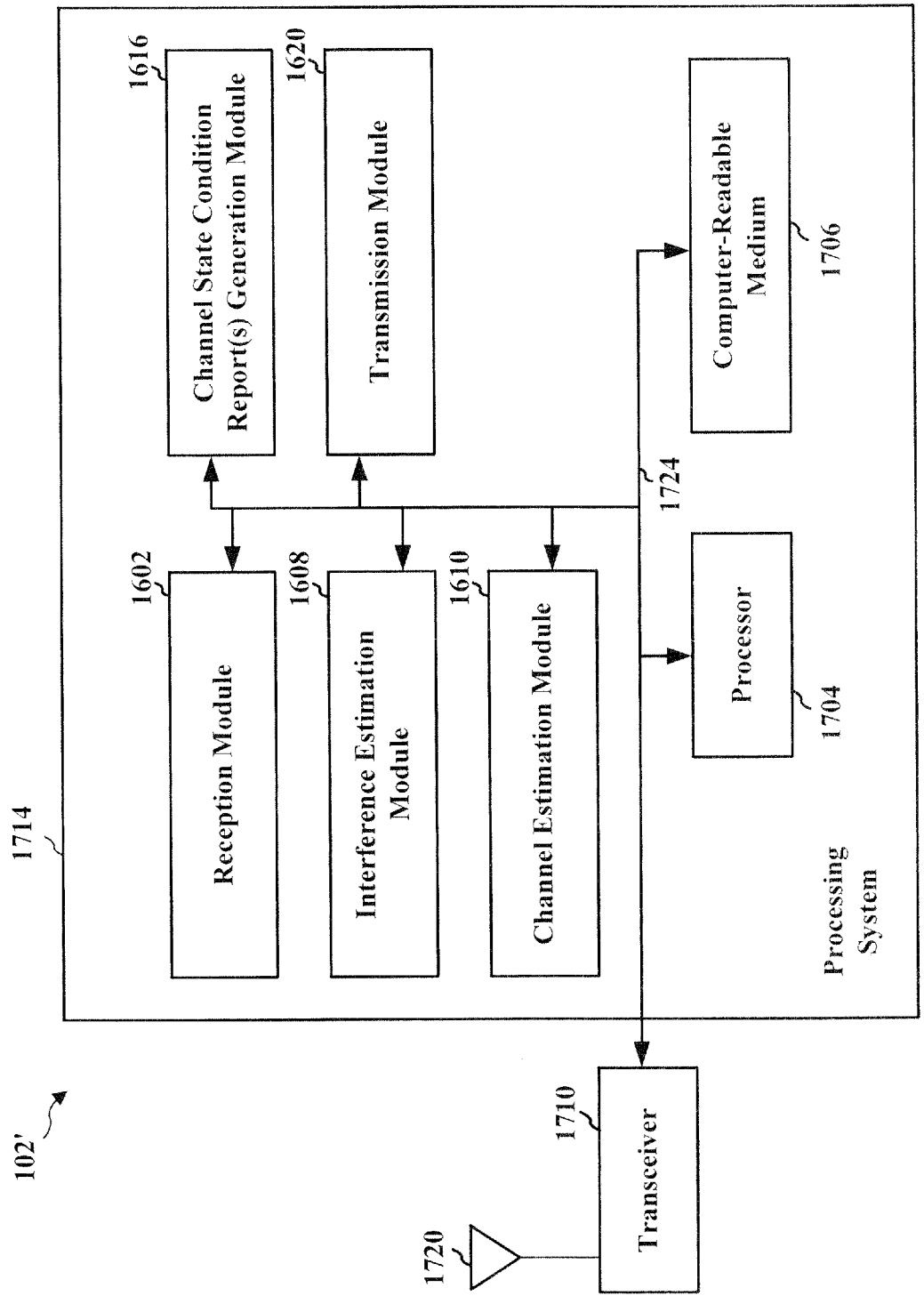
FIG. 17 is a conceptual block diagram illustrating the functionality of still another exemplary apparatus.

FIG. 17 is a diagram illustrating an example of a hardware implementation for an apparatus 102' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1602, 1608, 1610, 1616, 1620, and the computer-readable medium 1706. The bus 1724 may also link various other circuits such as timing sources, peripherals, voltage regulators, and power management circuits, which are well known in the art, and therefore, will not be described any further.

The apparatus includes a processing system 1714 coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes modules 1602, 1608, 1610, 1616, and 1620. The modules may be software modules running in the processor 1704, resident/stored in the computer readable medium 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communications, comprising:
   signaling an identifier, to a user equipment (UE), indicating a first resource pattern for a first resource pattern group and a second resource pattern for a second resource pattern group to measure channel state conditions, wherein the first and second resource pattern groups each includes a first set of resources corresponding to a first reference signal pattern for channel estimation on which a first transmission point in a serving cell transmits channel state information reference signals (CSI-RSs) and a second set of resources corresponding to a second reference signal pattern for interference estimation on which a second transmission point in the serving cell transmits the CSI-RSs and on which the first transmission point in the serving cell does not transmit the CSI-RSs;
   receiving at least one channel state condition report from the UE based, at least in part, on measurements obtained based on at least one of the first resource pattern or the second resource pattern; and
   determining one or more resources for use by the UE based on the at least one received channel state condition report.

2. The method of claim 1, wherein the signaling the identifier that indicates the first resource pattern for the first resource pattern group and second resource pattern for the second resource pattern group further comprises using at least one of radio resource control (RRC) or dynamic signaling.

3. The method of claim 1, wherein the first resource pattern for the first resource pattern group and second resource pattern for the second resource pattern group are further indicated based on a subframe on which the identifier is signaled.

4. The method of claim 1, wherein the identifier indicates the second reference signal pattern for interference estimation through a mapping that identifies the second reference signal pattern based on the first reference signal pattern used for channel estimation.

5. The method of claim 4, wherein the mapping between the first reference signal pattern and the second reference signal pattern depends on a subframe on which the identifier is signaled.

6. The method of claim 1, wherein the second reference signal pattern associated with first resource pattern is the same as the second reference signal pattern associated with the second resource pattern.

7. The method of claim 1 wherein the signaling further comprises instructions to account for interference from the second resource pattern group based on the first reference signal pattern associated with the second resource pattern.

8. The method of claim 7 wherein signaling further indicates precoding information for adjusting the channel state condition report.

9. The method of claim 1, wherein the first resource pattern and second resource pattern are channel state information reference signal (CSI-RS) patterns.

10. The method of claim 9, wherein the identifier further indicates a third resource pattern that corresponds to one or more common reference signal (CRS) patterns of the at least one of the first or second resource pattern groups, and wherein the measured channel state conditions are further based on the third resource pattern.

11. The method of claim 1, wherein the signaling comprising at least one of RRC signaling or dynamic signaling, wherein the RRC signaling comprises one or more identifier options, and wherein the dynamic signaling comprises one or more bits used to indicate which of the one or more identifier options is to be used.

12. The method of claim 1, wherein the signaling comprising at least one of RRC signaling or dynamic signaling, and wherein the dynamic signaling comprises a link to a bitmap indicating at least the first resource pattern and the second resource pattern.

13. The method of claim 1, wherein receiving the channel state condition report further comprises receiving periodic channel state condition reports, and wherein the measurements included in the report depend on information included in the identifier, wherein the identifier indicates at least one of:
different instances of measurements to be obtained for either the first or second resource pattern groups at different subframes, or
that a determined best set of measurements is to be included in the channel state condition report.

14. The method of claim 1, wherein the receiving the channel state condition report further comprises receiving an aperiodic channel state condition report, wherein the identifier indicates the measurements to be obtained for at least one of the first or second resource pattern groups.

15. The method of claim 1, wherein the identifier indicates at least one additional resource pattern, and wherein the received at least one channel condition report is further based, at least in part, on the at least one additional resource pattern.

16. A method of wireless communications, comprising:
receiving, by a UE, an identifier indicating signaling of a first resource pattern for a first resource pattern group and a second resource pattern for a second resource pattern group, wherein the first and second resource pattern groups each includes a first set of resources corresponding to a first reference signal pattern for channel estimation on which a first transmission point in a serving cell transmits channel state information reference signals (CSI-RSs) and a second set of resources corresponding to a second reference signal pattern for interference estimation on which a second transmission point in the serving cell transmits the CSI-RSs and on which the first transmission point in the serving cell does not transmit the CSI-RSs;
performing channel estimation for the first resource pattern group using the first reference signal pattern associated with the first resource pattern and for the second resource pattern group using the first reference signal pattern associated with the second resource pattern;
performing interference estimation for the first resource pattern group using the second reference signal pattern associated with the first resource pattern and for the second resource pattern group using the second reference signal pattern associated with the second resource pattern;
generating a channel state condition report for at least one of the first or second resource pattern groups based on at least a portion of the interference and channel estimations; and
transmitting the channel state condition report.

17. The method of claim 16, wherein the second reference signal pattern associated with first resource pattern is the same as the second reference signal pattern associated with the second resource pattern.

18. The method of claim 16, wherein the first and second resource patterns comprise CSI-RS patterns, respectively.

19. The method of claim 18, wherein receiving further comprises receiving a third resource pattern that comprises CRS patterns associated with the first and second resource pattern groups, and wherein the performing the interference estimation further comprises estimating interference from outside the first and second resource pattern groups based on the one or more CRS patterns.

20. The method of claim 16, further comprising:
determining a resource pattern group with a best channel state condition by comparing channel and interference estimation values among the first and second resource pattern groups; and
wherein the transmitting further comprises transmitting the channel state condition report associated with the resource pattern group with the best channel state condition.

21. The method of claim 16, wherein the identifier indicates the first resource pattern for the first resource pattern group and second resource pattern for the second resource pattern group using at least one of semi-static or dynamic signaling.

22. The method of claim 21, further comprising selecting the first resource pattern for the first resource pattern group and second resource pattern for the second resource pattern group based on a subframe.

23. The method of claim 16, wherein the identifier indicates the second reference signal pattern for interference estimation through a mapping that identifies the second reference signal pattern based on the first reference signal pattern used for channel estimation.

24. The method of claim 23, wherein the mapping between the first reference signal pattern and the second reference signal pattern depends on a subframe.

25. The method of claim 16, wherein the identifier indicates at least one additional resource pattern, wherein the performing channel and interference estimations further comprise performing channel estimation using the first reference signal pattern associated with the at least one additional resource pattern and performing interference estimation using the second reference signal pattern associated with the at least one additional resource pattern, and wherein the generating further comprises generating the channel state condition report for the at least one additional resource pattern.

26. An apparatus for wireless communication, comprising:
means for signaling an identifier, to a UE, indicating a first resource pattern for a first resource pattern group and a second resource pattern for a second resource pattern group to measure channel state conditions, wherein the first and second resource pattern groups each includes a first set of resources corresponding to a first reference signal pattern for channel estimation on which a first transmission point in a serving cell transmits channel state information reference signals (CSI-RSs) and a second set of resources corresponding to a second reference signal pattern for interference estimation on which a second transmission point in the serving cell transmits the CSI-RSs and on which the first transmission point in the serving cell does not transmit the CSI-RSs;

means for receiving at least one channel state condition report from the UE based, at least in part, on measurements obtained based on at least one of the first resource pattern or the second resource pattern; and means for determining one or more resources for use by the UE based on the at least one received channel state condition report.

27. The apparatus of claim 26, wherein the identifier indicates at least one additional resource pattern, and wherein the received at least one channel condition report is further based, at least in part, on the at least one additional resource pattern.

28. An apparatus of wireless communications, comprising:

means for receiving, by a UE, an identifier indicating signaling of a first resource pattern for a first resource pattern group and a second resource pattern for a second resource pattern group, wherein the first and second resource pattern groups each includes a first set of resources corresponding to a first reference signal pattern for channel estimation on which a first transmission point in a serving cell transmits channel state information reference signals (CSI-RSs) and a second set of resources corresponding to a second reference signal pattern for interference estimation on which a second transmission point in the serving cell transmits the CSI-RSs and on which the first transmission point in the serving cell does not transmit the CSI-RSs;

means for performing channel estimation for the first resource pattern group using the first reference signal pattern associated with the first resource pattern and for the second resource pattern group using the first reference signal pattern associated with the second resource pattern;

means for performing interference estimation for the first resource pattern group using the second reference signal pattern associated with the first resource pattern and for the second resource pattern group using the second reference signal pattern associated with the second resource pattern;

means for generating a channel state condition report for at least one of the first or second resource pattern groups based on at least a portion of the interference and channel estimations; and means for transmitting the channel state condition report.

29. The apparatus of claim 28, wherein the second reference signal pattern associated with first resource pattern is the same as the second reference signal pattern associated with the second resource pattern.

30. The apparatus of claim 28, wherein the first and second resource patterns comprise CSI-RS patterns, respectively.

31. The apparatus of claim 30, wherein the means for receiving further comprises means for receiving a third resource pattern that comprises CRS patterns associated with the first and second resource pattern groups, and wherein the means for performing the interference estimation further comprises means for estimating interference from outside the first and second resource pattern groups using the one or more CRS patterns.

32. The apparatus of claim 28, further comprising:

means for determining a resource pattern group with a best channel state condition by comparing channel and interference estimation values among the first and second resource pattern groups; and wherein the means for transmitting further comprises means for transmitting the channel state condition report associated with the resource pattern group with the best channel state condition.

33. The apparatus of claim 28, wherein the identifier indicates the first resource pattern for the first resource pattern group and second resource pattern for the second resource pattern group using at least one of semi-static or dynamic signaling.

34. The apparatus of claim 33, further comprising means for selecting the first resource pattern for the first resource pattern group and second resource pattern for the second resource pattern group based on a subframe.

35. The apparatus of claim 28, wherein the identifier indicates the second reference signal pattern for interference estimation through a mapping that indentifies the second reference signal pattern based on the first reference signal pattern used for channel estimation.

36. The apparatus of claim 35, wherein the mapping between the first reference signal pattern and the second reference signal pattern depends on a subframe.

37. The apparatus of claim 28, wherein the identifier indicates at least one additional resource pattern, wherein the means for performing channel and interference estimations further comprise means for performing channel estimation using the first reference signal pattern associated with the at least one additional resource pattern and means for performing interference estimation using the second reference signal pattern associated with the at least one additional resource pattern, and wherein the means for generating further comprises means for generating the channel state condition report for the at least one additional resource pattern.

38. A computer program product, comprising:

a non-transitory computer-readable medium comprising code for:

signaling an identifier, to a UE, indicating a first resource pattern for a first resource pattern group and a second resource pattern for a second resource pattern group to measure channel state conditions, wherein the first and second resource pattern groups each includes a first set of resources corresponding to a first reference signal pattern for channel estimation on which a first transmission point in a serving cell transmits channel state information reference signals (CSI-RSs) and a second set of resources corresponding to a second reference signal pattern for interference estimation on which a second transmission point in the serving cell transmits the CSI-RSs and on which the first transmission point in the serving cell does not transmit the CSI-RSs;

receiving at least one channel state condition report from the UE based, at least in part, on measurements obtained based on at least one of the first resource pattern or the second resource pattern; and determining one or more resources for use by the UE based on the at least one received channel state condition report.

39. A computer program product, comprising:

a non-transitory computer-readable medium comprising code for:

receiving, by a UE, an identifier indicating signaling of a first resource pattern for a first resource pattern group and a second resource pattern for a second resource pattern group, wherein the first and second resource pattern groups each includes a first set of resources corresponding to a first reference signal pattern for channel estimation on which a first transmission point in a serving cell transmits channel state information reference signals (CSI-RSs) and a second set of resources corresponding to a second reference signal pattern for interference estimation on which a second transmission point in the serving cell transmits the CSI-RSs and on which the first transmission point in the serving cell does not transmit the CSI-RSs;

performing channel estimation for the first resource pattern group using the first reference signal pattern associated with the first resource pattern and for the second resource pattern group using the first reference signal pattern associated with the second resource pattern;

performing interference estimation for the first resource pattern group using the second reference signal pattern associated with the first resource pattern and for the second resource pattern group using the second reference signal pattern associated with the second resource pattern;

generating a channel state condition report for at least one of the first or second resource pattern groups based on at least a portion of the interference and channel estimations; and transmitting the channel state condition report.

40. An apparatus for wireless communication, comprising:
a processing system configured to:
signal an identifier, to a UE, indicating a first resource pattern for a first resource pattern group and a second resource pattern for a second resource pattern group to measure channel state conditions, wherein the first and second resource pattern groups each includes a first set of resources corresponding to a first reference signal pattern for channel estimation on which a first transmission point in a serving cell transmits channel state information reference signals (CSI-RSs) and a second set of resources corresponding to a second reference signal pattern for interference estimation on which a second transmission point in the serving cell transmits the CSI-RSs and on which the first transmission point in the serving cell does not transmit the CSI-RSs;

receive at least one channel state condition report from the UE based, at least in part, on measurements obtained based on at least one of the first resource pattern or the second resource pattern; and determine one or more resources for use by the UE based on the at least one received channel state condition report.

41. The apparatus of claim 40, wherein the second reference signal pattern associated with first resource pattern is the same as the second reference signal pattern associated with the second resource pattern.

42. The apparatus of claim 40, wherein the processing system is further configured to signal instructions to account for interference from the second resource pattern group based on the first reference signal pattern associated with the second resource pattern.

43. The apparatus of claim 42, wherein the processing system is further configured to signal precoding information for adjusting the channel state condition report based on interference from either the first resource pattern group or the second resource pattern group based on which of the first or second resource pattern groups is not selected for the channel state condition report.

44. The apparatus of claim 43, wherein the identifier further indicates a third resource pattern that corresponds to one or more common reference signal (CRS) patterns of the at least one of the first or second resource pattern groups, and wherein the measured channel state conditions are further based on the third resource pattern.

45. The apparatus of claim 40, wherein the processing system is further configured to signal at least one of RRC signaling or dynamic signaling, wherein the RRC signaling comprises one or more identifier options, and wherein the dynamic signaling comprises one or more bits used to indicate which of the one or more identifier options is to be used.

46. The apparatus of claim 40, wherein the processing system is further configured to signal using RRC signaling or dynamic signaling, and wherein the dynamic signaling comprises a link to a bitmap indicating at least the first resource pattern and the second resource pattern.

47. The apparatus of claim 40, wherein the processing system is further configured to receive periodic channel state condition reports, wherein the measurements included in the report depend on information included in the identifier, and wherein the identifier indicates at least one of:
different instances of measurements to be obtained for either the first or second resource pattern groups at different subframes, or
that a determined best set of measurements is to be included in the channel state condition report.

48. The apparatus of claim 40, wherein the processing system is further configured to receive an aperiodic channel state condition report, wherein the identifier indicates the measurements to be obtained for at least one of the first or second resource pattern groups.

49. An apparatus of wireless communications, comprising:
a processing system configured to:
receive an identifier indicating signaling of a first resource pattern for a first resource pattern group and a second resource pattern for a second resource pattern group, wherein the first and second resource pattern groups each includes a first set of resources corresponding to a first reference signal pattern for channel estimation on which a first transmission point in a serving cell transmits channel state information reference signals (CSI-RSs) and a second set of resources corresponding to a second reference signal pattern for interference estimation on which a second transmission point in the serving cell transmits the CSI-RSs and on which the first transmission point in the serving cell does not transmit the CSI-RSs;

perform channel estimation for the first resource pattern group using the first reference signal pattern associated with the first resource pattern and for the second resource pattern group using the first reference signal pattern associated with the second resource pattern;

perform interference estimation for the first resource pattern group using the second reference signal pattern associated with the first resource pattern and for the second resource pattern group using the second reference signal pattern associated with the second resource pattern;

generate a channel state condition report for at least one of the first or second resource pattern groups based on at least a portion of the interference and channel estimations; and transmit the channel state condition report.

50. The apparatus of claim 49, wherein the processing system is further configured to:
receive a third resource pattern that comprises CRS patterns associated with the first and second resource pattern groups; and estimate interference from outside the first and second resource pattern groups using the one or more CRS patterns.

51. The apparatus of claim 49, wherein the processing system is further configured to:

determine a resource pattern group with a best channel state condition by comparing channel and interference estimation values among the first and second resource pattern groups; and transmit the channel state condition report associated with the resource pattern group with the best channel state condition.

52. The apparatus of claim 49, wherein the identifier indicates at least one additional resource pattern, wherein the processing system is further configured to:

perform channel estimation using the first reference signal pattern associated with the at least one additional resource pattern and means for performing interference estimation using the second reference signal pattern associated with the at least one additional resource pattern; and generate the channel state condition report for the at least one additional resource pattern.

\* \* \* \* \*